United States Patent
Bleyer et al.

(10) Patent No.: US 11,539,931 B2
(45) Date of Patent: Dec. 27, 2022

(54) DUAL SYSTEM OPTICAL ALIGNMENT FOR SEPARATED CAMERAS

(71) Applicant: Microsoft Technology Licensing, LLC, Redmond, WA (US)

(72) Inventors: Michael Bleyer, Seattle, WA (US); Christopher Douglas Edmonds, Carnation, WA (US); Raymond Kirk Price, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 16/900,354

(22) Filed: Jun. 12, 2020

(65) Prior Publication Data
US 2021/0392312 A1 Dec. 16, 2021

(51) Int. Cl.
*H04N 13/111* (2018.01)
*H04N 13/332* (2018.01)
*H04N 13/239* (2018.01)

(52) U.S. Cl.
CPC ........ *H04N 13/111* (2018.05); *H04N 13/239* (2018.05); *H04N 13/332* (2018.05)

(58) Field of Classification Search
CPC .. H04N 13/239; H04N 13/332; H04N 13/111; G06F 3/012; G06F 3/013
See application file for complete search history.

(56) References Cited

U.S. PATENT DOCUMENTS

| 2015/0029218 | A1  | 1/2015  | Williams et al. |
| 2019/0096135 | A1  | 3/2019  | Dai et al. |
| 2020/0145579 | A1* | 5/2020  | Noh .................... H04N 5/23238 |
| 2020/0249748 | A1* | 8/2020  | Ranganathan .......... A63F 13/40 |
| 2020/0348750 | A1* | 11/2020 | Selan .................... H04N 13/344 |
| 2021/0044792 | A1* | 2/2021  | Taylor .................. H04N 13/344 |
| 2021/0065432 | A1* | 3/2021  | Bickerstaff ............. G06T 17/20 |
| 2021/0258555 | A1* | 8/2021  | Lei ....................... H04N 13/344 |

OTHER PUBLICATIONS

Nguyen, Tan, "Low-latency Mixed Reality Headset", Retrieved From: https://people.eecs.berkeley.edu/~kubitron/courses/cs262a-F19/projects/reports/project14_report.pdf, Jan. 1, 2019, 10 Pages.
"International Search Report and Written Opinion Issued in PCT Application No. PCT/Us2021/023698", dated Jul. 2, 2021, 30 Pages.

* cited by examiner

*Primary Examiner* — Rowina J Cattungal
(74) *Attorney, Agent, or Firm* — Workman Nydegger

(57) ABSTRACT

Improved techniques for generating images are disclosed herein. A first image is generated by an integrated camera. The pose of the computer system is determined based on the image, and a timestamp is determined. A detached camera generates a second image. The second image is aligned with the first image. An overlaid image is generated by overlaying the second image onto the first image based on the alignment. A pose difference is then identified between a current pose of the computer and the initial pose. Consequently, late stage reprojection (LSR) is performed on the overlaid image to account for the pose difference. The LSR-corrected overlaid image is then displayed.

20 Claims, 15 Drawing Sheets

DUAL SYSTEM OPTICAL ALIGNMENT FOR SEPARATED CAMERAS

BACKGROUND

Mixed-reality (MR) systems, including virtual-reality (VR) and augmented-reality (AR) systems, have received significant attention because of their ability to create truly unique experiences for their users. For reference, conventional VR systems create completely immersive experiences by restricting their users' views to only virtual environments. This is often achieved through the use of a head-mounted device (HMD) that completely blocks any view of the real world. As a result, a user is entirely immersed within the virtual environment. In contrast, conventional AR systems create an augmented-reality experience by visually presenting virtual objects that are placed in or that interact with the real world.

As used herein, VR and AR systems are described and referenced interchangeably. Unless stated otherwise, the descriptions herein apply equally to all types of MR systems, which (as detailed above) include AR systems, VR reality systems, and/or any other similar system capable of displaying virtual content.

A MR system may also employ different types of cameras in order to display content to users, such as in the form of a passthrough image. A passthrough image or view can aid users in avoiding disorientation and/or safety hazards when transitioning into and/or navigating within a MR environment. A MR system can present views captured by cameras in a variety of ways. The process of using images captured by world-facing cameras to provide views of a real-world environment creates many challenges, however.

Some of these challenges occur when attempting to align image content from multiple cameras. Often, this alignment process requires detailed timestamp information and pose information in order to perform the alignment processes. Sometimes, however, timestamp data or perhaps even pose data is not available because different cameras may be operating in different time domains such that they have a temporal offset. Furthermore, sometimes the timestamp data is simply not available because the cameras may be operating remotely from one another, and the timestamp data is not transmitted. Aligning image content provides substantial benefits, especially in terms of hologram placement and generation, so these problems present serious obstacles to the technical field. Accordingly, there is a substantial need in the field to improve how images are aligned with one another.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., wearable devices, hardware storage devices, etc.), and methods for aligning and stabilizing images generated by an integrated camera that is physically mounted to a computer system (e.g., perhaps an HMD) with images generated by a detached camera that is physically unmounted from the computer system.

In some embodiments, a first image is generated using the integrated camera. This first image is used to determine a first pose of the computer system. Additionally, a first timestamp is determined for the first image. The embodiments also acquire a second image generated by the detached camera. The second image is aligned with the first image. An overlaid image is generated by overlaying the second image onto the first image based on the alignment process. A pose difference is identified between a current pose of the computer system at a current timestamp and the first pose that was determined using the first image at the first timestamp. Late stage reprojection (LSR) is applied to the overlaid image to transform pixels in the overlaid image to account for the pose difference identified between the current pose associated with the current timestamp and the first pose associated with the first timestamp. After applying the LSR to the overlaid image, the embodiments display the overlaid image.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments disclosed herein relate to systems, devices (e.g., wearable devices, hardware storage devices, etc.), and methods for aligning and stabilizing (e.g., perhaps via late stage reprojection (LSR)) images generated by an integrated camera that is physically mounted to a computer system (e.g., perhaps an HMD) with images generated by a detached camera that is physically unmounted from the computer system.

In some embodiments, a first image is generated using the integrated camera. This first image is used to determine a first pose of the computer system. Additionally, a first timestamp is determined for the first image. A second image, which was generated by the detached camera, is acquired. The second image is aligned with the first image so that an overlaid image can be generated. A pose difference is identified between a current pose of the computer system at a current timestamp and the first pose. Late stage reprojection (LSR) is applied to the overlaid image to account for the pose difference. After applying the LSR, the embodiments display the overlaid image.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments provide substantial improvements, benefits, and practical applications to the technical field. By way of example, the disclosed embodiments improve how images are generated and displayed and improve how image content is aligned, even without the use of timestamp data.

That is, the embodiments solve the problem of not having the exact timestamp of a remote or detached camera image when attempting to align that image's content with another image to create a single composite or overlaid image. There may be a variety of reasons as to why the information regarding the timestamp might not be known. For instance, asynchronous wireless communications might be occurring between multiple devices operating over different time domains, resulting in the occurrence of not knowing the timestamp. Notwithstanding this potential lack of information, the embodiments are still able to perform image alignment because the embodiments do not necessarily perform image matching based on timestamp data. Consequently, the embodiments provide improvements to the technical field by enabling the ability to perform image matching without requiring temporal data.

Example MR Systems and HMDs

Figure 1:
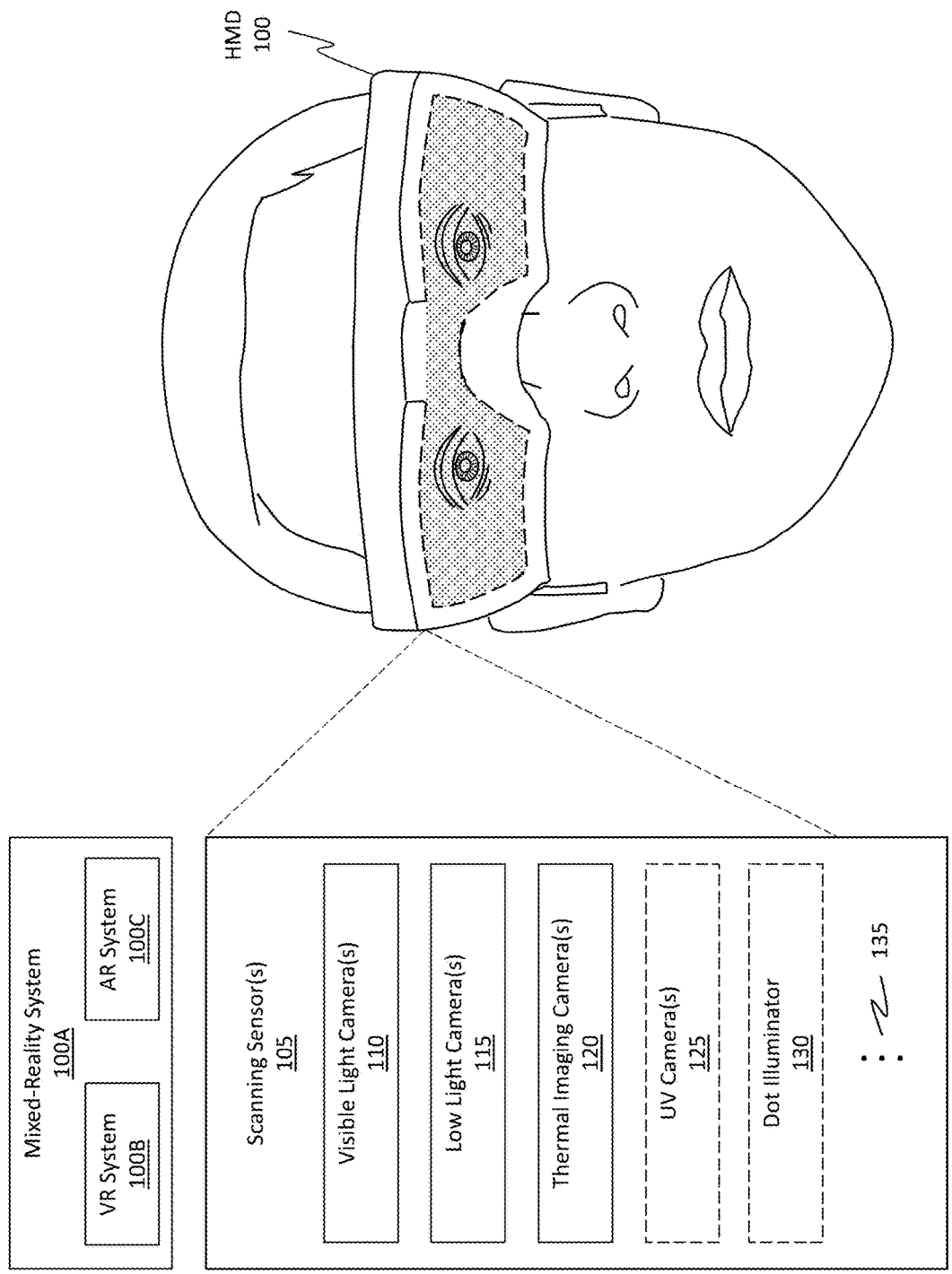
FIG. 1 illustrates an example head-mounted device (HMD).

Attention will now be directed to FIG. 1, which illustrates an example of a head-mounted device (HMD) 100. HMD 100 can be any type of MR system 100A, including a VR system 100B or an AR system 100C. It should be noted that while a substantial portion of this disclosure is focused on the use of an HMD, the embodiments are not limited to being practiced using only an HMD. That is, any type of scanning or camera system can be used, even systems entirely removed or separate from an HMD. As such, the disclosed principles should be interpreted broadly to encompass any type of scanning scenario or device. Some embodiments may even refrain from actively using a scanning device themselves and may simply use the data generated by the scanning device. For instance, some embodiments may at least be partially practiced in a cloud computing environment.

HMD 100 is shown as including scanning sensor(s) 105 (i.e. a type of scanning or camera system), and HMD 100 can use the scanning sensor(s) 105 to scan environments, map environments, capture environmental data, and/or generate any kind of images of the environment (e.g., by generating a 3D representation of the environment or by generating a "passthrough" visualization). Scanning sensor(s) 105 may comprise any number or any type of scanning devices, without limit.

In accordance with the disclosed embodiments, the HMD 100 may be used to generate a passthrough visualizations of the user's environment. As used herein, a "passthrough" visualization refers to a visualization that reflects the perspective of the environment from the HMD's point of view, regardless of whether the HMD 100 is included as a part of an AR system or a VR system. To generate this passthrough visualization, the HMD 100 may use its scanning sensor(s) 105 to scan, map, or otherwise record its surrounding environment, including any objects in the environment, and to pass that data on to the user to view.

To generate a passthrough image, the scanning sensor(s) 105 typically rely on its cameras (e.g., head tracking cameras, hand tracking cameras, depth cameras, or any other type of camera) to obtain one or more raw images (aka texture images) of the environment. In addition to generating passthrough images, these raw images may also be used to determine depth data detailing the distance from the sensor to any objects captured by the raw images (e.g., a z-axis range or measurement). Once these raw images are obtained, then a depth map can be computed from the depth data embedded or included within the raw images (e.g., based on pixel disparities), and passthrough images can be generated (e.g., one for each pupil) using the depth map for any reprojections, if needed.

From the passthrough visualizations, a user will be able to perceive what is currently in his/her environment without having to remove or reposition the HMD 100. Furthermore, as will be described in more detail later, the disclosed passthrough visualizations will also enhance the user's ability to view objects within his/her environment (e.g., by displaying additional environmental conditions that may not have been detectable by a human eye). As used herein, a so-called "overlaid image" can be a type of passthrough image.

It should be noted that while the majority of this disclosure focuses on generating "a" passthrough image, the embodiments actually generate a separate passthrough image for each one of the user's eyes. That is, two passthrough images are typically generated concurrently with one another. Therefore, while frequent reference is made to generating what seems to be a single passthrough image, the embodiments are actually able to simultaneously generate multiple passthrough images.

In some embodiments, scanning sensor(s) 105 include visible light camera(s) 110, low light camera(s) 115, thermal imaging camera(s) 120, potentially (though not necessarily, as represented by the dotted box in FIG. 1) ultraviolet (UV) camera(s) 125, and potentially (though not necessarily, as represented by the dotted box) a dot illuminator 130. The ellipsis 135 demonstrates how any other type of camera or camera system (e.g., depth cameras, time of flight cameras, virtual cameras, depth lasers, etc.) may be included among the scanning sensor(s) 105.

As an example, a camera structured to detect mid-infrared wavelengths may be included within the scanning sensor(s) 105. As another example, any number of virtual cameras that are reprojected from an actual camera may be included among the scanning sensor(s) 105 and may be used to generate a stereo pair of images. In this manner, the scanning sensor(s) 105 may be used to generate the stereo pair of images. In some cases, the stereo pair of images may be obtained or generated as a result of performing any one or more of the following operations: active stereo image generation via use of two cameras and one dot illuminator (e.g., dot illuminator 130); passive stereo image generation via use of two cameras; image generation using structured light via use of one actual camera, one virtual camera, and one dot illuminator (e.g., dot illuminator 130); or image generation using a time of flight (TOF) sensor in which a baseline is present between a depth laser and a corresponding camera and in which a field of view (FOV) of the corresponding camera is offset relative to a field of illumination of the depth laser.

Generally, a human eye is able to perceive light within the so-called "visible spectrum," which includes light (or rather, electromagnetic radiation) having wavelengths ranging from about 380 nanometers (nm) up to about 740 nm. As used herein, the visible light camera(s) 110 include two or more red, green, blue (RGB) cameras structured to capture light photons within the visible spectrum. Often, these RGB cameras are complementary metal-oxide-semiconductor (CMOS) type cameras, though other camera types may be used as well (e.g., charge coupled devices, CCD).

The RGB cameras are typically stereoscopic cameras, meaning that the fields of view of the two or more RGB cameras at least partially overlap with one another. With this overlapping region, images generated by the visible light camera(s) 110 can be used to identify disparities between certain pixels that commonly represent an object captured by both images. Based on these pixel disparities, the embodiments are able to determine depths for objects located within the overlapping region (i.e. "stereoscopic depth matching" or "stereo depth matching"). As such, the visible light camera(s) 110 can be used to not only generate passthrough visualizations, but they can also be used to determine object depth. In some embodiments, the visible light camera(s) 110 can capture both visible light and IR light.

The low light camera(s) 115 are structured to capture visible light and IR light. IR light is often segmented into three different classifications, including near-IR, mid-IR, and far-IR (e.g., thermal-IR). The classifications are determined based on the energy of the IR light. By way of example, near-IR has relatively higher energy as a result of having relatively shorter wavelengths (e.g., between about 750 nm and about 1,000 nm). In contrast, far-IR has relatively less energy as a result of having relatively longer wavelengths (e.g., up to about 30,000 nm). Mid-IR has energy values in between or in the middle of the near-IR and far-IR ranges. The low light camera(s) 115 are structured to detect or be sensitive to IR light in at least the near-IR range.

In some embodiments, the visible light camera(s) 110 and the low light camera(s) 115 (aka low light night vision cameras) operate in approximately the same overlapping wavelength range. In some cases, this overlapping wavelength range is between about 400 nanometers and about 1,000 nanometers. Additionally, in some embodiments these two types of cameras are both silicon detectors.

One distinguishing feature between these two types of cameras is related to the illuminance conditions or illuminance range(s) in which they actively operate. In some cases, the visible light camera(s) 110 are low power cameras and operate in environments where the illuminance is between about 10 lux and about 100,000 lux, or rather, the illuminance range begins at about 10 lux and increases beyond 10 lux. In contrast, the low light camera(s) 115 consume more power and operate in environments where the illuminance range is between about 1 milli-lux and about 10 lux.

The thermal imaging camera(s) 120, on the other hand, are structured to detect electromagnetic radiation or IR light in the far-IR (i.e. thermal-IR) range, though some embodiments also enable the thermal imaging camera(s) 120 to detect radiation in the mid-IR range. To clarify, the thermal imaging camera(s) 120 may be a long wave infrared imaging camera structured to detect electromagnetic radiation by measuring long wave infrared wavelengths. Often, the thermal imaging camera(s) 120 detect IR radiation having wavelengths between about 8 microns and 14 microns. Because the thermal imaging camera(s) 120 detect far-IR radiation, the thermal imaging camera(s) 120 can operate in any illuminance condition, without restriction.

In some cases (though not all), the thermal imaging camera(s) 120 include an uncooled thermal imaging sensor. An uncooled thermal imaging sensor uses a specific type of detector design that is based on a bolometer, which is a device that measures the magnitude or power of an incident electromagnetic wave/radiation. To measure the radiation, the bolometer uses a thin layer of absorptive material (e.g., metal) connected to a thermal reservoir through a thermal link. The incident wave strikes and heats the material. In response to the material being heated, the bolometer detects a temperature-dependent electrical resistance. Changes to environmental temperature cause changes to the bolometer's temperature, and these changes can be converted into an electrical signal to thereby produce a thermal image of the environment. In accordance with at least some of the disclosed embodiments, the uncooled thermal imaging sensor is used to generate any number of thermal images. The bolometer of the uncooled thermal imaging sensor can detect electromagnetic radiation across a wide spectrum, spanning the mid-IR spectrum, the far-IR spectrum, and even up to millimeter-sized waves.

The UV camera(s) 125 are structured to capture light in the UV range. The UV range includes electromagnetic radiation having wavelengths between about 10 nm and about 400 nm. The disclosed UV camera(s) 125 should be interpreted broadly and may be operated in a manner that includes both reflected UV photography and UV induced fluorescence photography.

Accordingly, as used herein, reference to "visible light cameras" (including "head tracking cameras"), are cameras that are primarily used for computer vision to perform head tracking. These cameras can detect visible light, or even a combination of visible and IR light (e.g., a range of IR light, including IR light having a wavelength of about 850 nm). In some cases, these cameras are global shutter devices with pixels being about 3 µm in size. Low light cameras, on the other hand, are cameras that are sensitive to visible light and near-IR. These cameras are larger and may have pixels that are about 8 µm in size or larger. These cameras are also sensitive to wavelengths that silicon sensors are sensitive to, which wavelengths are between about 350 nm to 1100 nm. Thermal/long wavelength IR devices (i.e. thermal imaging cameras) have pixel sizes that are about 10 µm or larger and detect heat radiated from the environment. These cameras are sensitive to wavelengths in the 8 µm to 14 µm range. Some embodiments also include mid-IR cameras configured to detect at least mid-IR light. These cameras often comprise non-silicon materials (e.g., InP or InGaAs) that detect light in the 800 nm to 2 µm wavelength range.

Accordingly, the disclosed embodiments may be structured to utilize numerous different camera types. The different camera types include, but are not limited to, visible light cameras, low light cameras, thermal imaging cameras, and UV cameras. Passthrough image generation and even stereo depth matching may be performed using images generated from any one type or combination of types of the above listed camera types.

Generally, the low light camera(s) 115, the thermal imaging camera(s) 120, and the UV camera(s) 125 (if present) consume relatively more power than the visible light camera(s) 110. Therefore, when not in use, the low light camera(s) 115, the thermal imaging camera(s) 120, and the UV camera(s) 125 are typically in the powered-down state in which those cameras are either turned off (and thus consuming no power) or in a reduced operability mode (and thus consuming substantially less power than if those cameras were fully operational). In contrast, the visible light camera(s) 110 are typically in the powered-up state in which those cameras are by default fully operational.

It should be noted that any number of cameras may be provided on the HMD 100 for each of the different camera types. That is, the visible light camera(s) 110 may include 1, 2, 3, 4, 5, 6, 7, 8, 9, 10, or more than 10 cameras. Often, however, the number of cameras is at least 2 so the HMD 100 can perform passthrough image generation and/or stereoscopic depth matching, as described earlier. Similarly, the low light camera(s) 115, the thermal imaging camera(s) 120, and the UV camera(s) 125 may each respectively include 1, 2, 3, 4, 5, 6, 7, 8, 9, 10, or more than 10 corresponding cameras.

Figure 2:
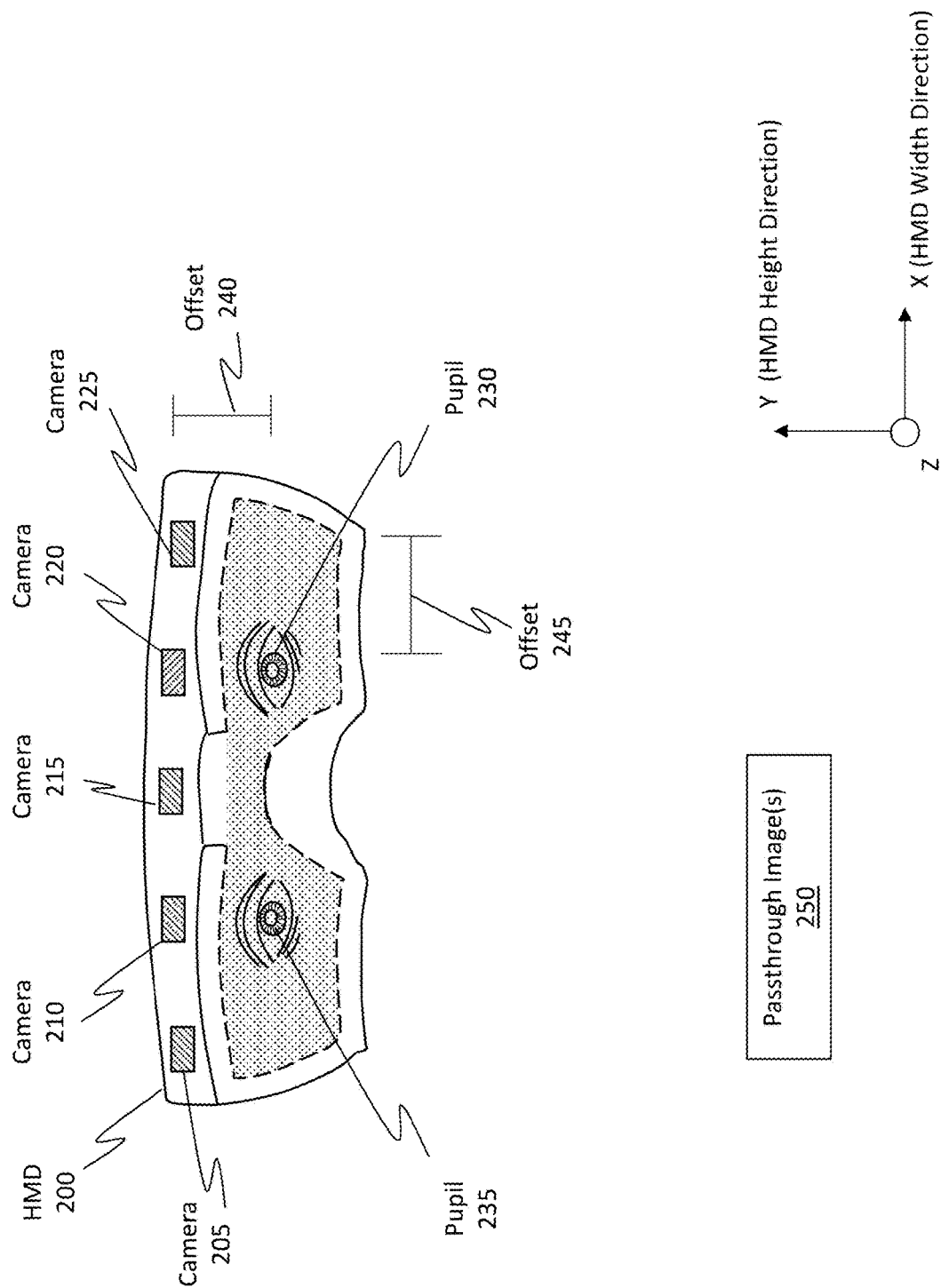
FIG. 2 illustrates some various features regarding the cameras on an HMD.

FIG. 2 illustrates an example HMD 200, which is representative of the HMD 100 from FIG. 1. HMD 200 is shown as including multiple different cameras, including cameras 205, 210, 215, 220, and 225. Cameras 205-225 are representative of any number or combination of the visible light camera(s) 110, the low light camera(s) 115, the thermal imaging camera(s) 120, and the UV camera(s) 125 from FIG. 1. While only 5 cameras are illustrated in FIG. 2, HMD 200 may include more or less than 5 cameras.

In some cases, the cameras can be located at specific positions on the HMD 200. For instance, in some cases a first camera (e.g., perhaps camera 220) is disposed on the HMD 200 at a position above a designated left eye position of any users who wear the HMD 200 relative to a height direction of the HMD. For instance, the camera 220 is positioned above the pupil 230. As another example, the first camera (e.g., camera 220) is additionally positioned above the designated left eye position relative to a width direction of the HMD. That is, the camera 220 is positioned not only above the pupil 230 but also in-line relative to the pupil 230. When a VR system is used, a camera may be placed directly in front of the designated left eye position. For example, with reference to FIG. 2, a camera may be physically disposed on the HMD 200 at a position in front of the pupil 230 in the z-axis direction.

When a second camera is provided (e.g., perhaps camera 210), the second camera may be disposed on the HMD at a position above a designated right eye position of any users who wear the HMD relative to the height direction of the HMD. For instance, the camera 210 is above the pupil 235. In some cases, the second camera is additionally positioned above the designated right eye position relative to the width direction of the HMD. When a VR system is used, a camera may be placed directly in front of the designated right eye position. For example, with reference to FIG. 2, a camera may be physically disposed on the HMD 200 at a position in front of the pupil 235 in the z-axis direction.

When a user wears HMD 200, HMD 200 fits over the user's head and the HMD 200's display is positioned in front of the user's pupils, such as pupil 230 and pupil 235. Often, the cameras 205-225 will be physically offset some distance from the user's pupils 230 and 235. For instance, there may be a vertical offset in the HMD height direction (i.e. the "Y" axis), as shown by offset 240. Similarly, there may be a horizontal offset in the HMD width direction (i.e. the "X" axis), as shown by offset 245.

HMD 200 is configured to provide passthrough image(s) 250 for the user of HMD 200 to view. In doing so, HMD 200 is able to provide a visualization of the real world without requiring the user to remove or reposition HMD 200. These passthrough image(s) 250 effectively represent the view of the environment from the HMD's perspective. Cameras 205-225 are used to provide these passthrough image(s) 250. In some implementations, the embodiments utilize a planar reprojection process when generating the passthrough images. Using this planar reprojection process is acceptable when objects in the environment are sufficiently far away from the HMD. Thus, in some cases, the embodiments are able to refrain from performing parallax correction because the objects in the environment are sufficiently far away and because that distance results in a negligible error with regard to depth visualizations or parallax issues.

Integrated Camera and Detached Camera Operations

Figure 3:
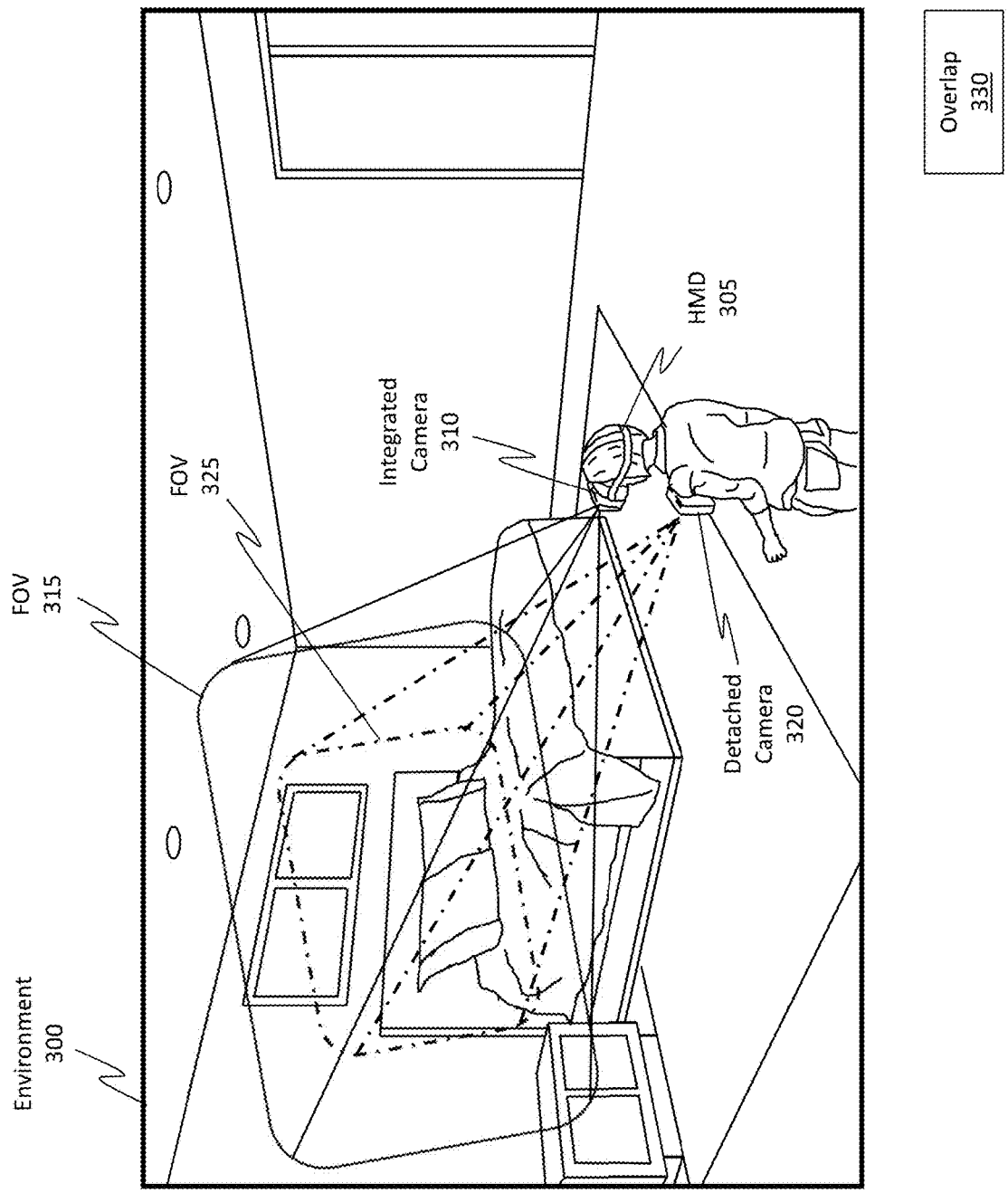
FIG. 3 illustrates how an HMD and a remote camera (i.e. a detached camera) can operate in unison to provide enhanced imagery to a user.

Attention will now be directed to FIG. 3, which illustrates an environment 300 in which an HMD 305 is operating in. HMD 305 is representative of the HMD 200 from FIG. 2.

In this scenario, HMD 305 includes an integrated camera 310 that is physically mounted to the HMD 305. For instance, integrated camera 310 may be any of the cameras 205-225 mentioned in FIG. 2. Similarly, integrated camera 310 may be any of the cameras mentioned in FIG. 1, such as the visible light camera(s) 110, the low light camera(s) 115, the thermal imaging camera(s) 120, or even the UV camera(s) 125. Integrated camera 310 is shown scanning the environment 300 via the field of view (FOV) 315. That is, the objects included in the FOV 315 will be represented in an image generated by the integrated camera 310.

FIG. 3 also shows the presence or use of a detached camera 320. Here, the detached camera 320 is physically unmounted from the HMD 305. For instance, in this particular scenario, the detached camera 320 is strapped or otherwise placed on the user's chest. In some scenarios, the detached camera 320 may not be placed on the user's body but may instead be placed on an object held by the user. As one example, suppose the detached camera 320 is mounted on a selfie stick or another type of extended rod. In some cases, the detached camera 320 may be attached to some other piece of equipment being used by the user. In some cases, the detached camera 320 may be entirely removed from control of the user, such as when the detached camera 320 is placed on the ground or perhaps on another user.

FIG. 3 shows how the detached camera 320 is associated with its own corresponding FOV 325. That is, objects included within the FOV 325 will be captured or included in an image generated by the detached camera 320. One will appreciate how both the integrated camera 310 and the detached camera 320 are able to generate still images as well as videos, without limit.

In accordance with the disclosed principles, at least a portion of the FOV 315 overlaps with the FOV 325, as shown by the overlap 330 condition. This overlap 330 enables the embodiments to generate multiple images and then overlay image content from one image onto another image in order to generate a composite image or an overlaid image having enhanced features that would not be present if only a single image were used.

It should be noted that while this disclosure primarily focuses on the use of two images, the embodiments are able to align content from more than two images having overlapping regions. For instance, suppose 2, 3, 4, 5, 6, 7, 8, 9, or even 10 images have overlapping content. The embodiments are able to examine each image and then align specific portions with one another. The resulting overlaid image may then be a composite image formed from any combination or alignment of the available images (e.g., even 10 or more images, if available). Accordingly, the embodiments are able to utilize any number of images when performing the disclosed operations and are not limited to only two images.

Suppose the integrated camera 310 is a low light camera and further suppose the detached camera 320 is a thermal imaging camera. As will be discussed in more detail later, the embodiments are able to selectively extract image content from the thermal imaging camera image and overlay that image content onto the image generated by the low light camera. In this regard, the thermal imaging content can be used to augment or supplement the low light image content, thereby providing enhanced image content to the user. Further details on these features will be provided later.

Figure 4:
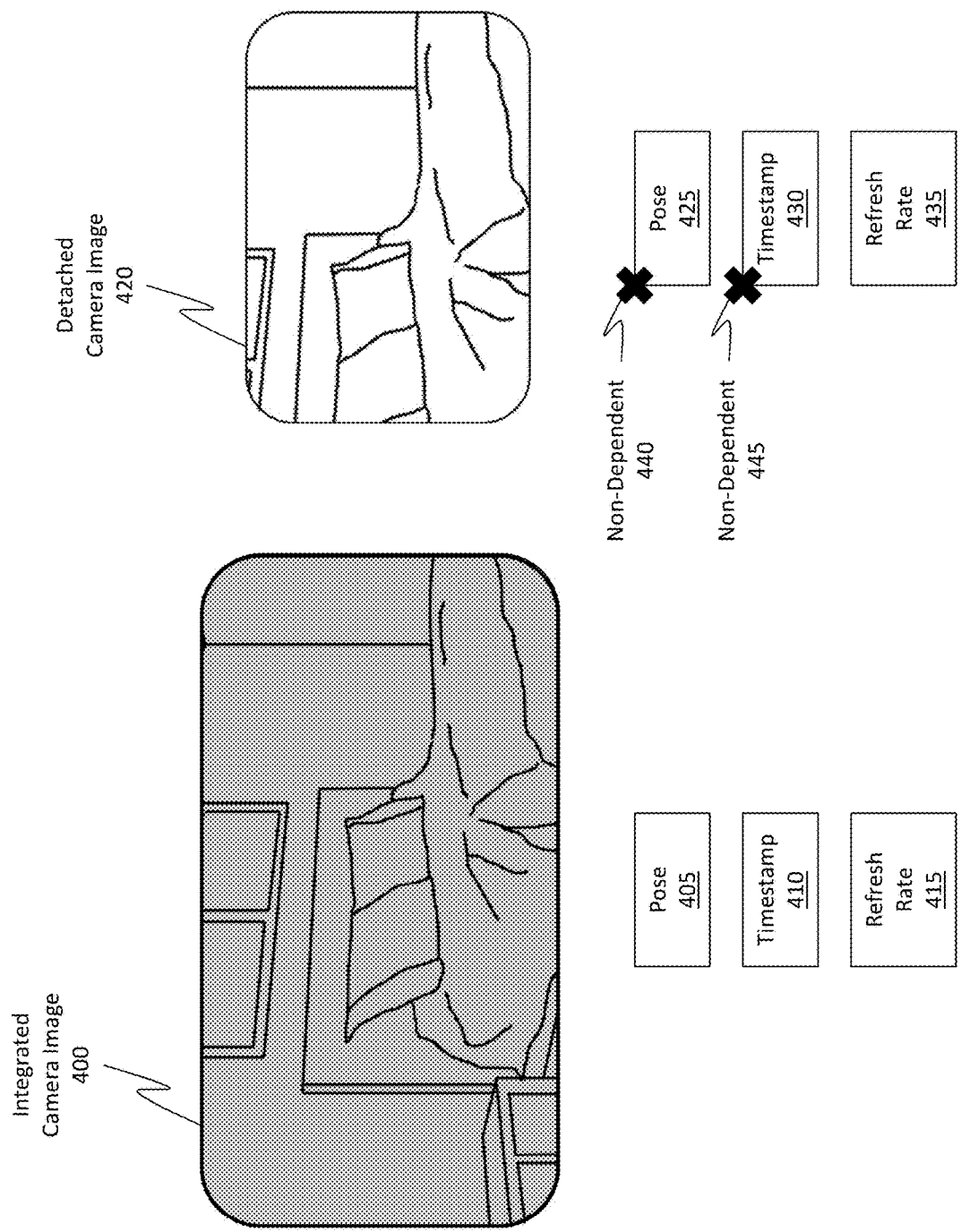
FIG. 4 illustrates an example of an integrated camera image and a detached camera image.

FIG. 4 shows a resulting image that is generated by the integrated camera 310 of FIG. 3 in the form of integrated camera image 400. The shading shown in FIG. 4 for the integrated camera image 400 is provided in order to distinguish that image from any other images. The shading should not be interpreted as meaning that the integrated camera image 400 is any particular type of image.

By analyzing the content included in the integrated camera image 400, the embodiments are able to determine a pose 405 of the HMD (e.g., HMD 305 from FIG. 3). For instance, by detecting anchor points (e.g., points identified as being relatively static or non-moving), the embodiments are able to determine the orientation or pose 405 of the HMD relative to the surrounding environment.

Additionally, a timestamp 410 may be determined for the integrated camera image 400. Timestamp 410 identifies the time at which the integrated camera image 400 was generated. Of course, the timestamp 410 may be based on any timing calculation, including an absolute time such as determined by an atomic clock or, alternatively, including any type of relative time, such as processor clock cycles and so forth.

The integrated camera 310 from FIG. 3 generated the integrated camera image 400, and the integrated camera 310 operates at a particular refresh rate 415 for generating new images. This refresh rate 415 may be set to any value. Often, however, the refresh rate 415 is at least between 30 Hz and 90 Hz. In some cases, the refresh rate 415 is higher than 90 Hz, such as perhaps 120 Hz or higher. Often, the refresh rate 415 is around 90 Hz.

FIG. 4 also shows a detached camera image 420, which was generated by the detached camera 320 from FIG. 3. In FIG. 4, the detached camera image 420 is shown as being smaller in size than the size of the integrated camera image 400, but that size discrepancy is simply for illustrative purposes only. In some cases, the detached camera image 420 may have a higher resolution than the resolution of the integrated camera image 400 while in other cases the detached camera image 420 may have a lower resolution than the resolution of the integrated camera image 400. In some cases, the resolutions of the two images may be the same.

The integrated camera image 400 (e.g., a "first" image) may be one of a visible light image, a low light image, or a thermal image. The detached camera image 420 (e.g., a "second" image) may be a different one of the visible light image, the low light image, or the thermal image, or perhaps even the same type of image as the first image.

Similar to the discussion regarding the integrated camera image 400, the embodiments are also able to use the detached camera image 420 to determine some additional information. Notably, these operations are not strictly necessary, and in some cases can be skipped or refrained from being performed. As such, the following discussion refers to some operations that may or may not be performed.

Specifically, the embodiments are able to analyze the content in the detached camera image 420 to determine a pose 425 of the detached camera 320 from FIG. 3. Similarly, a timestamp 430 can be determined for the detached camera image 420. In some cases, the timestamp 410 is different, or reflects a different time, relative to the timestamp 430 such that the two images may have a temporal offset.

The detached camera 320 may also have its own refresh rate 435. This refresh rate 435 may be set to any value. Often, however, the refresh rate 435 is at least between 10 Hz and 60 Hz. In some cases, the refresh rate 435 is higher than 60 Hz, such as perhaps 90 Hz or 120 Hz or even higher. Typically, the refresh rate 435 is around 30 Hz. In some cases, the refresh rate 435 is the same as the refresh rate 415 while in other cases the refresh rate 435 is different from the refresh rate 415. When the two refresh rates are different, then the two cameras (e.g., the integrated camera 310 and the detached camera 320 from FIG. 3) operate in different time domains.

As briefly introduced earlier, in some instances the embodiments can refrain from determining the pose 425 and the timestamp 430. The darkened arrow labeled as non-dependent 440 represents how the embodiments can refrain from determining the pose 425 and the darkened arrow labeled non-dependent 445 represents how the embodiments can refrain from determining the timestamp 430. In some cases this non-dependency is based on a lack of information (e.g., such as in a case where the data is not transmitted) or is based on the embodiments refraining from computing the information. Further details on these aspects will be provided later.

Figure 5:
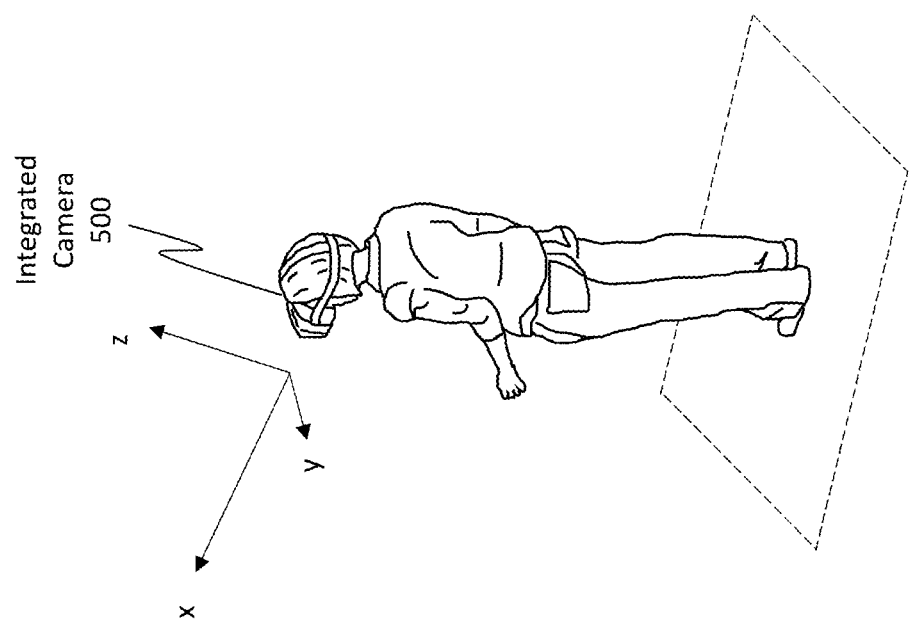
FIG. 5 illustrates how a pose of the computer system can be determined based on imagery generated by an integrated camera.
Figure 5:
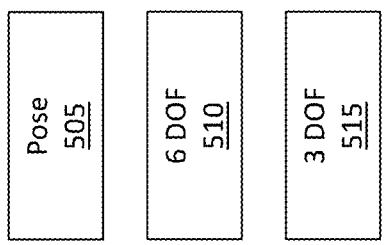

Regarding pose determinations, FIG. 5 provides some additional information. FIG. 5 shows an integrated camera 500, which is representative of the integrated cameras discussed thus far. FIG. 5 also shows a pose 505, which is representative of the pose 405 from FIG. 4. In accordance with the disclosed principles, the pose 505 refers to at least the x-y-z location of the integrated camera 500 relative to its environment.

In some cases, the pose 505 may include information detailing the 6 degrees of freedom, or 6 DOF 510, information. Generally, the 6 DOF 510 refers to the movement or position of an object in three-dimensional space. The 6 DOF 510 includes surge (i.e. forward and backward in the x-axis direction), heave (i.e. up and down in the z-axis direction), and sway (i.e. left and right in the y-axis direction). In this regard, 6 DOF 510 refers to the combination of 3 translations and 3 rotations. Any possible movement of a body can be expressed using the 6 DOF 510.

In some cases, the pose 505 may include information detailing the 3 DOF 515. Generally, the 3 DOF 515 refers to tracking rotational motion only, such as pitch (i.e. the transverse axis), yaw (i.e. the normal axis), and roll (i.e. the longitudinal axis). In this regard, 3 DOF 515 allows the HMD to track rotational motion but not translational movement. As a further explanation, the 3 DOF 515 allows the HMD to determine whether a user (who is wearing the HMD) is looking left or right, whether the user is rotating his/her head up or down, or whether the user is pivoting left or right. In contrast to the 6 DOF 510, when 3 DOF 515 is used, the HMD is not able to determine whether the user has moved in a translational manner, such as by moving to a new location in the environment.

Determining the 6 DOF 510 and the 3 DOF 515 can be performed using inbuilt sensors, such as accelerometers, gyroscopes, and magnetometers. Determining the 6 DOF 510 can also be performed using positional tracking sensors, such as head tracking sensors.

Image Correspondences and Alignment

Figure 6:
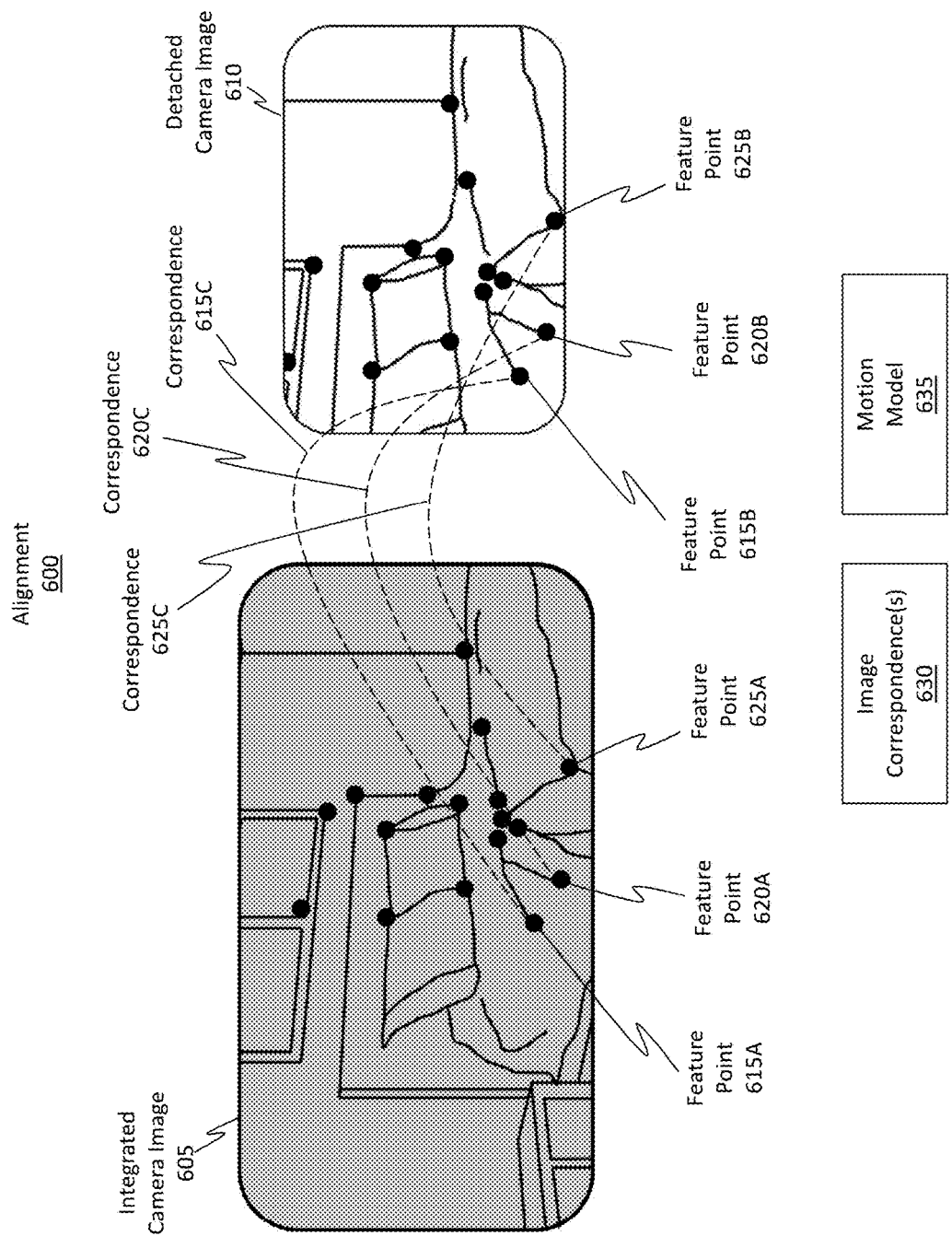
FIG. 6 illustrates an example alignment process in which image correspondences between the integrated camera image and the detached camera image are identified in order to align the two images together, irrespective of a timestamp or a pose of the detached camera image.

In accordance with the disclosed principles, the embodiments are able to align the integrated camera image 400 shown in FIG. 4 with the detached camera image 420. That is, because at least a portion of the two camera's FOVs overlap with one another, as was described in FIG. 3, at least a portion of the resulting images include corresponding content. Consequently, that corresponding content can be identified and then a merged, fused, or overlaid image can be generated based on the similar corresponding content. By generating this overlaid image, the embodiments are able to provide enhanced image content to the user, which enhanced image content would not be available if only a single image type were provided to a user. FIG. 6 illustrates a first type of alignment 600 that may be used to align image content from two (or potentially more than two) different images.

FIG. 6 shows an integrated camera image 605, which is representative of the integrated camera image 400 from FIG. 4, and a detached camera image 610, which is representative of the detached camera image 420 from FIG. 4. These two images are also often referred to as "texture" images.

The embodiments are able to analyze the texture images (i.e. perform computer vision feature detection) in an attempt to find any number of feature points. As used herein, the phrase "feature detection" generally refers to the process of computing image abstractions and then determining whether an image feature (e.g., of a particular type) is present at any particular point or pixel in the image. Often, corners (e.g., the corners of a wall), distinguishable edges (e.g., the edge of a table), or ridges are used as feature points because of the inherent or sharp contrasting visualization of an edge or corner.

FIG. 6 shows a number of example feature points in the integrated camera image 605, as shown by feature point 615A, feature point 620A, and feature point 625A. Other feature points are identified using the darkened circles but are not labeled. Notice, these feature points relate to corners, edges, or other ridges, such as the folds in the blanket and pillows as well as the corners of the picture and walls. Any type of feature detector may be programmed to identify feature points. In some cases, the feature detector may be a machine learning algorithm.

As used herein, reference to any type of machine learning may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

FIG. 6 also shows how the embodiments are able to analyze, examine, or review the detached camera image 610 to identify feature points, as shown by the darkened circles. Examples include, but are not limited to, the feature point 615B, the feature point 620B, and the feature point 625B.

In accordance with the disclosed principles, the embodiments detect any number of feature points (e.g., 1, 2, 3, 4, 5, 6, 7, 8, 9, 10, 20, 30, 40, 50, 60, 70, 80, 90, 100, 200, 500, 1,000, 2,000, or more than 2,000) and then attempt to identify correlations or correspondences between the feature points detected in the integrated camera image 605 and the feature points identified in the detached camera image 610. For instance, the correspondence 615C has been identified in which the feature point 615A is linked, or corresponds, with the feature point 615B. Similarly, the correspondence 620C has been identified in which the feature point 620A is determined to correspond to the feature point 620B. The correspondence 625C has been identified in which the feature point 625A is determined to align or correspond with the feature point 625B. While only three correspondences are visualized, one will appreciate how any number of correspondences may be identified.

The summation or compilation of the identified correspondences (e.g., correspondences 615C, 620C, and 625C) constitute image correspondence(s) 630. Accordingly, in some embodiments, the alignment 600 process includes identifying any number of feature points and then identifying correlations or correspondences between the feature points in the two (or more) different images.

Note, in this implementation, the embodiments refrain from determining a pose or a timestamp of the detached camera image 610. Instead, the embodiments rely on the feature matching in order to determine whether or not to overlay the image content from one image onto another image. By way of additional clarification, these embodiments are non-dependent 440 from FIG. 4 on the pose and are non-dependent 445 on the timestamp.

Some embodiments then fit the feature or image correspondence(s) 630 to a motion model 635 in order to overlay one image onto another image to form an enhanced overlaid image. The motion model 635 may be any type of motion model. Generally, a motion model is a type of transformation matrix that enables a model, a known scene, or an object to be projected onto a different model, scene, or object.

In some cases, the motion model 635 may simply be a rotational motion model. With a rotational model, the embodiments are able to shift one image by any number of pixels (e.g., perhaps 5 pixels to the left and 10 pixels up) in order to overlay one image onto another image. For instance, once the image correspondence(s) 630 are identified, the embodiments can identify the pixel coordinates of those feature points or correspondence(s). Once the coordinates are identified, then the embodiments can overlay the detached camera image 610 onto the integrated camera image 605 using the rotational motion model approach described above.

In some cases, the motion model 635 may be more complex, such as in the form of a similarity transform model. The similarity transform model may be configured to allow for (i) rotation of either one of the integrated camera image 605 (e.g., a "first" image) or the detached camera image 610 (e.g., a "second" image), (ii) scaling of the first image or the second image, or (iii) homographic transformations of the first image or the second image. In this regard, the similarity transform model approach may be used to overlay image content from one image onto another image. Further details regarding this overlaying process will be provided later. Accordingly, in some cases, the process of aligning the detached camera image (e.g., a "second" image) with the integrated camera image (e.g., a "first" image) is performed by (i) identifying image correspondences between the second image and the first image and then, (ii) based on the identified image correspondences, fitting the correspondences to a motion model such that the second image is projected onto the first image.

Figure 7:
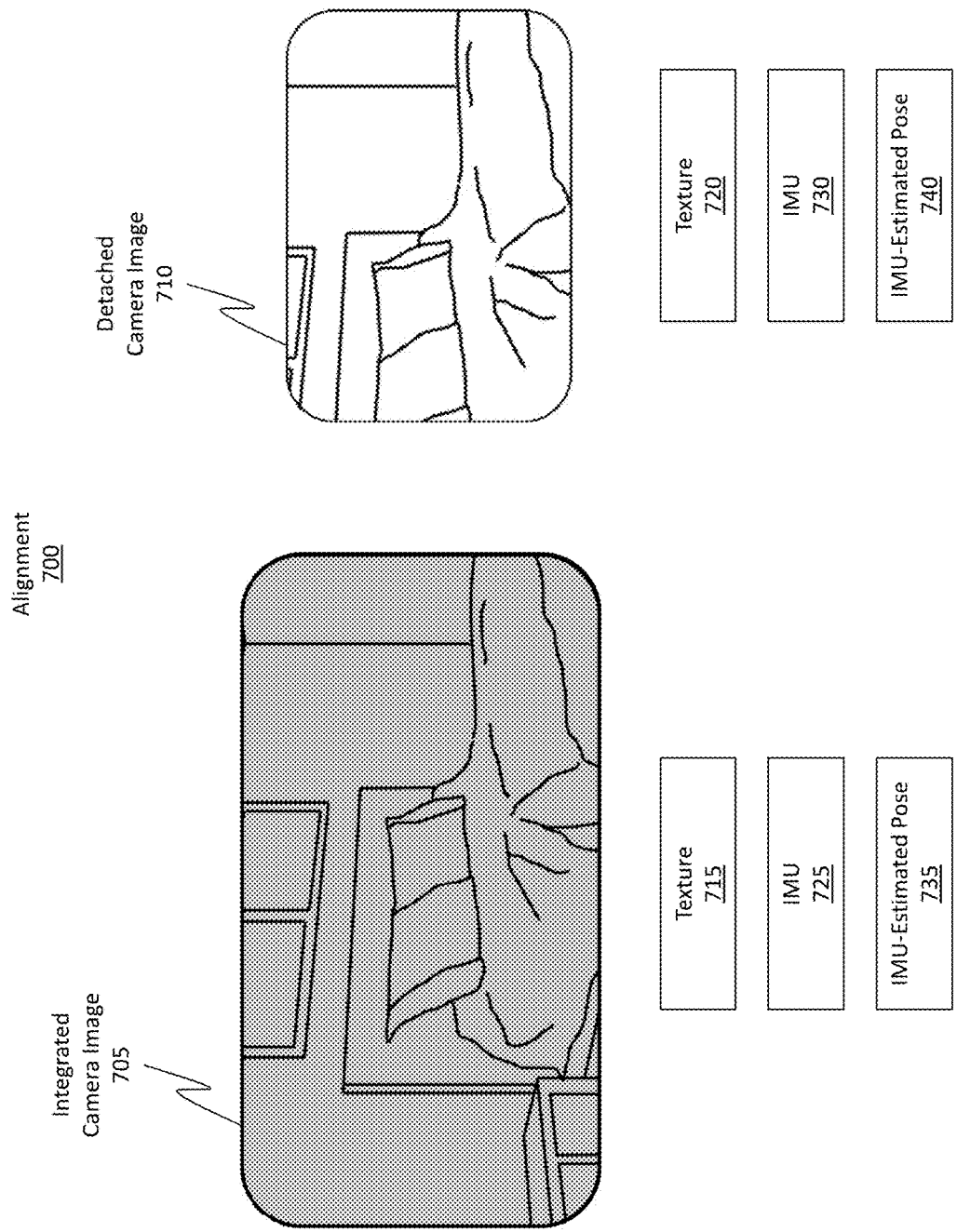
FIG. 7 illustrates an example alignment process in which the integrated camera image is aligned with the detached camera image based on estimated poses that are determined using inertial measurement units (IMUs).

FIG. 7 illustrates another alignment 700 operation that may be performed in order to align content from the two images so that the content can be overlaid to form an overlaid image. Specifically, FIG. 7 shows an integrated camera image 705 and a detached camera image 710, both of which are representative of their corresponding images discussed in the earlier figures.

The integrated camera image 705 includes texture 715. As used herein, texture 715 generally refers to information regarding the spatial arrangement of color or intensities that are included in the image. Similarly, the detached camera image 710 is shown as including texture 720.

In accordance with the alignment 700 operation, the embodiments determine that the texture 715 in the integrated camera image 705 and/or the texture 720 in the detached camera image 710 is insufficient to perform feature matching or image correspondence matching, as was described in connection with FIG. 6. For instance, perhaps an insufficient number of features points are detected in either one of the two images. Additionally, or alternatively, perhaps a sufficient number of feature points were detected but perhaps an insufficient number of correspondences were identified. Based on this initial determination, the embodiments resort or fallback to the alignment 700 operation, which is based on a predicted or estimated pose as determined by various inertial measurement units (IMUs).

Specifically, the integrated camera that generated the integrated camera image 705 is associated with a first IMU 725. Similarly, the detached camera that generated the detached camera image 710 is associated with a second IMU 730. The embodiments utilize the IMU 725 to determine a pose of the integrated camera based, perhaps, on an initial bootstrap visual (e.g., an initial base image generated by the integrated camera) in combination with IMU data generated by the IMU 725. Similarly, the embodiments utilize the IMU 730 to determine a pose of the detached camera based, perhaps, on an initial bootstrap visual (e.g., an initial base image generated by the detached camera) in combination with IMU data generated by the IMU 730.

Figure 8:
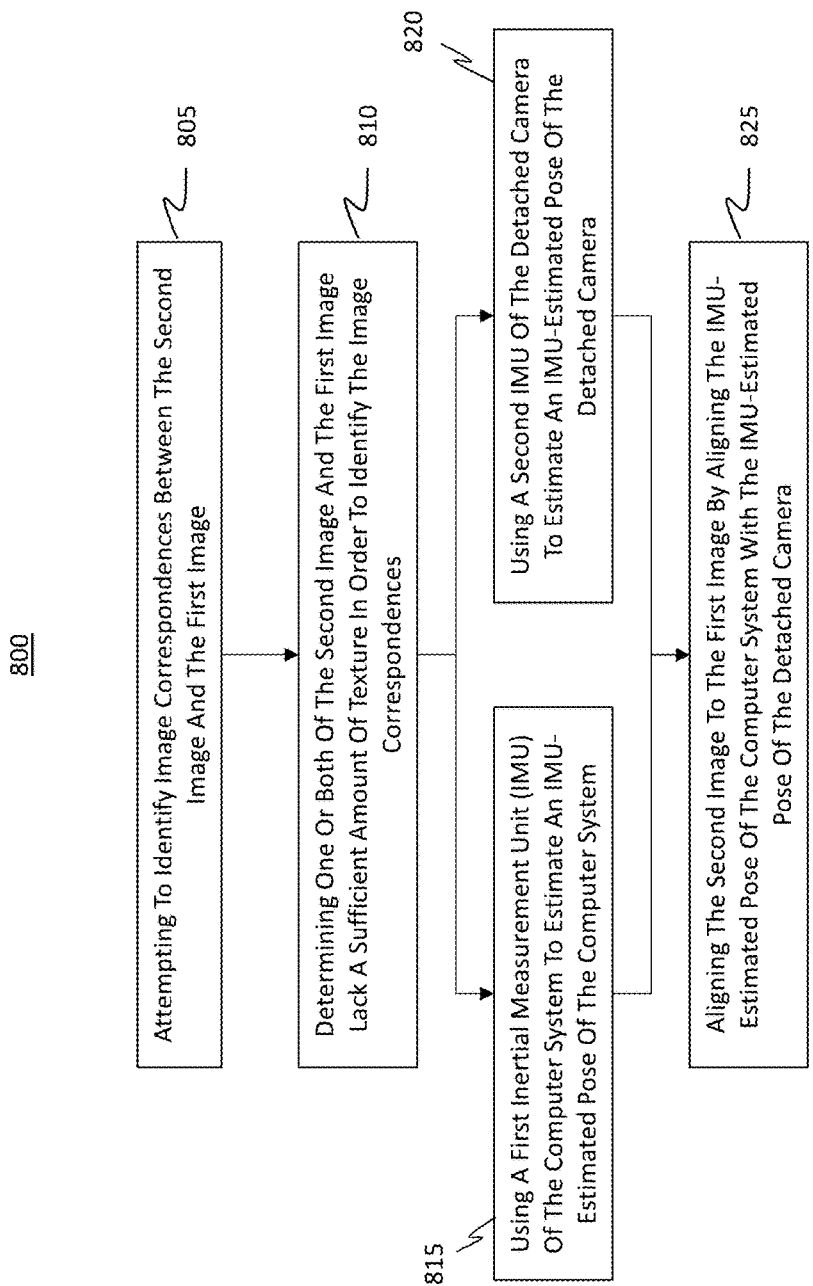
FIG. 8 illustrates a flowchart for aligning images based on IMU-estimated poses.

Once the two poses are estimated or determined, as shown by IMU-estimated pose 735 and IMU-estimated pose 740, the embodiments then use those poses to align one or more portions of the images with one another. Once aligned, then one or more portions of one image (which portions are the aligned portions) are overlaid onto the corresponding portions of the other image in order to generate an enhanced overlaid image. In this regard, IMUs can be used to determine poses of the corresponding cameras, and those poses can then be used to perform the alignment processes. FIG. 8 illustrates an example flowchart 800 for aligning image content from a second image (e.g., the detached camera image 710 from FIG. 7) with the first image (e.g., the integrated camera image 705) using the IMUs discussed in FIG. 7.

Specifically, flowchart 800 initially includes an act (act 805) of attempting to identify image correspondences between the second image and the first image. For instance, the embodiments may initially attempt to perform the alignment 600 operation discussed in FIG. 6 in which feature points are attempted to be used for the alignment.

Flowchart 800 then includes an act (act 810) of determining one or both of the second image and the first image lack a sufficient amount or threshold amount of texture in order to identify the image correspondences. For instance, the texture 715 or 720 from FIG. 7 may not satisfy a texture threshold such that a sufficient number or threshold number of image correspondences cannot be identified.

Flowchart 800 then includes an act (act 815) of using a first inertial measurement unit (IMU) of the computer system (e.g., perhaps IMU 725 from FIG. 7) to estimate an IMU-estimated pose (e.g., IMU-estimated pose 735) of the computer system.

Either in parallel or in serial with act 815, flowchart 800 includes an act (act 820) of using a second IMU of the detached camera (e.g., perhaps IMU 730) to estimate an IMU-estimated pose of the detached camera (e.g., IMU-estimated pose 740).

Flowchart 800 then includes an act (act 825) of aligning the second image to the first image by aligning the IMU-estimated pose of the computer system with the IMU-estimated pose of the detached camera. In this regard, flowchart 800 generally outlines the processes that were discussed in connection with the alignment 700 operation of FIG. 7. Accordingly, multiple different alignment techniques may be utilized to align image content or to identify image correspondences.

Figure 9:
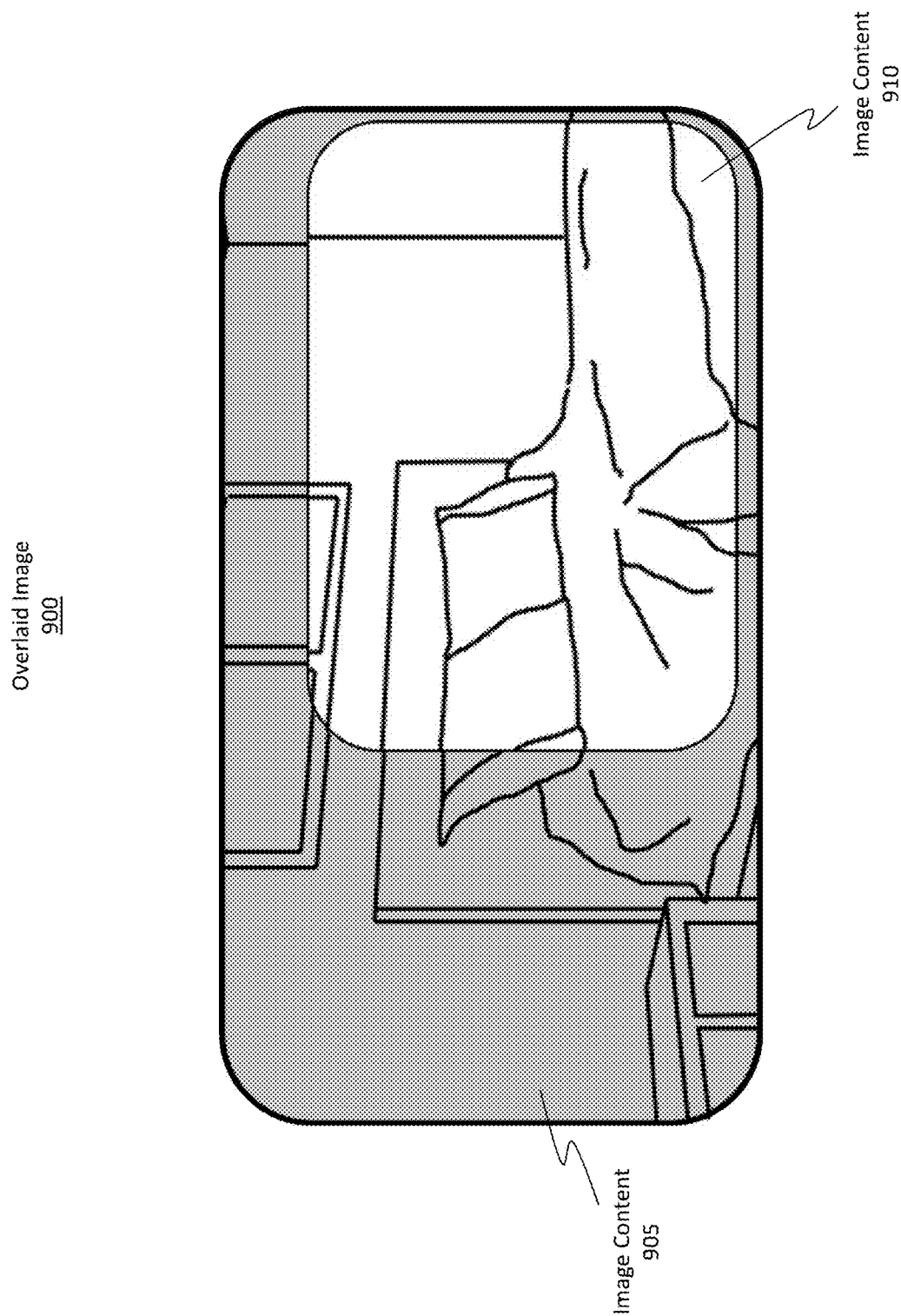
FIG. 9 illustrates an example of an overlaid image that is generated as a result of overlaying the detached camera image onto the integrated camera image based on the alignments that were previously performed.

Based on whichever alignment process is used, the embodiments then generate an overlaid image, as shown in FIG. 9. Specifically, FIG. 9 shows an overlaid image 900, which is comprised of image content 905 and image content 910. Of course, image content may be pulled or extracted from any number of images that have been aligned within one another, without limit.

The image content 905 is extracted, pulled, or drawn from the integrated camera images discussed thus far (e.g., integrated camera image 705 of FIG. 7) while the image content 910 is extracted, pulled, or drawn from the detached camera images discussed thus far (e.g., detached camera image 710). In some cases, the image content 905 includes all of the image content from the integrated camera image while in other cases image content 905 includes only a portion of the image content from the integrated camera image. Similarly, the image content 910 may, in some cases, include all of the image content from the detached camera image while in other cases the image content 910 includes only a portion of the image content from the detached camera image.

The amount that is included in the image content 905 and 910 may, in some cases, be dependent on the degree or level of overlap between the FOVs of the integrated camera and the detached camera. With reference to FIG. 3, in this scenario, the FOV 315 entirely consumes, overlaps, or envelopes the FOV 325. The resulting integrated camera image might then include, possibly in its entirety, the entire content included in the detached camera image. If only a portion of the two images overlap, then only content associated with that portion may be included in the overlaid image 900.

Generating this overlaid image 900 is highly beneficial for a number of reasons. For instance, suppose the image content 905 is low light image content or visible light content and suppose the image content 910 is thermal imaging content. The thermal imaging content may be used to enhance or supplement the low light or visible light content by providing an increased amount of situational awareness of information regarding the environment.

In some cases, the image content 910 and/or the image content 905 may be at least partially transparent. For instance, suppose the image content 910 is overlaid on top of the image content 905. The image content 905 may include content that is currently being overlaid by the image content 910. If the image content 910 were at least partially transparent, then both the image content 905 and the image content 910 will be visually displayed, thereby providing even further visual enhancements or even further visual information. The transparency may be set to any value. For instance, the transparency may be set to 1%, 5%, 10%, 15%, 20%, 25%, 50%, 75%, or even up to 99%, or any value in-between.

Late Stage Reprojection

When an image frame (e.g., the overlaid image 900 from FIG. 9) is finished being rendered, the embodiments are able to determine whether the pose depicted in that frame matches with the current pose of the computer system. If the poses match, then the image can be displayed to the user. On the other hand, if the poses do not match, then a late stage reprojection (LSR) process may be performed to transform the pixels in the image to compensate for the new pose. Often, the LSR is performed to correct only for 3 DOF changes (e.g., yaw, pitch roll) because objects are often far removed from the HMD such that forward or backward projections can be avoided due to a planar reprojection or planar viewpoint of the objects in the scene (e.g., all objects may be assigned the same planar depth). In some cases, however, the LSR may be performed to correct for 6 DOF changes.

To clarify, the process of generating and rendering frames is not an instantaneous process; instead, that process takes some amount of time to execute. For instance, at 60 frames per second (FPS), the rendering application or HMD takes approximately 16.667 milliseconds (ms) to render the frame. Although that is a small duration in time, it may be the case that the HMD has shifted position during that time period (e.g., the user may have moved, thereby causing the HMD to move). LSR is a process by which the pixels in the image (e.g., the overlaid image 900) are transformed or modified in order to account for the shift in perspective or pose.

By way of additional clarification, in an effort to reduce or eliminate some rendering errors or issues occurring as a result of differences in pose over time, the HMD is able to apply late stage corrections to make final adjustments to the image after the image is rendered by the GPU. This process is performed before the pixels are displayed so as to compensate for the latest rotation, translation, and/or magnifications resulting from the user's head movement. This adjustment process is often referred to as "Late State Adjustment", "Late Stage Reprojection", "LSR" or "LSR Adjustments." FIGS. 10 and 11 provide some useful illustrations regarding these LSR operations.

Figure 10:
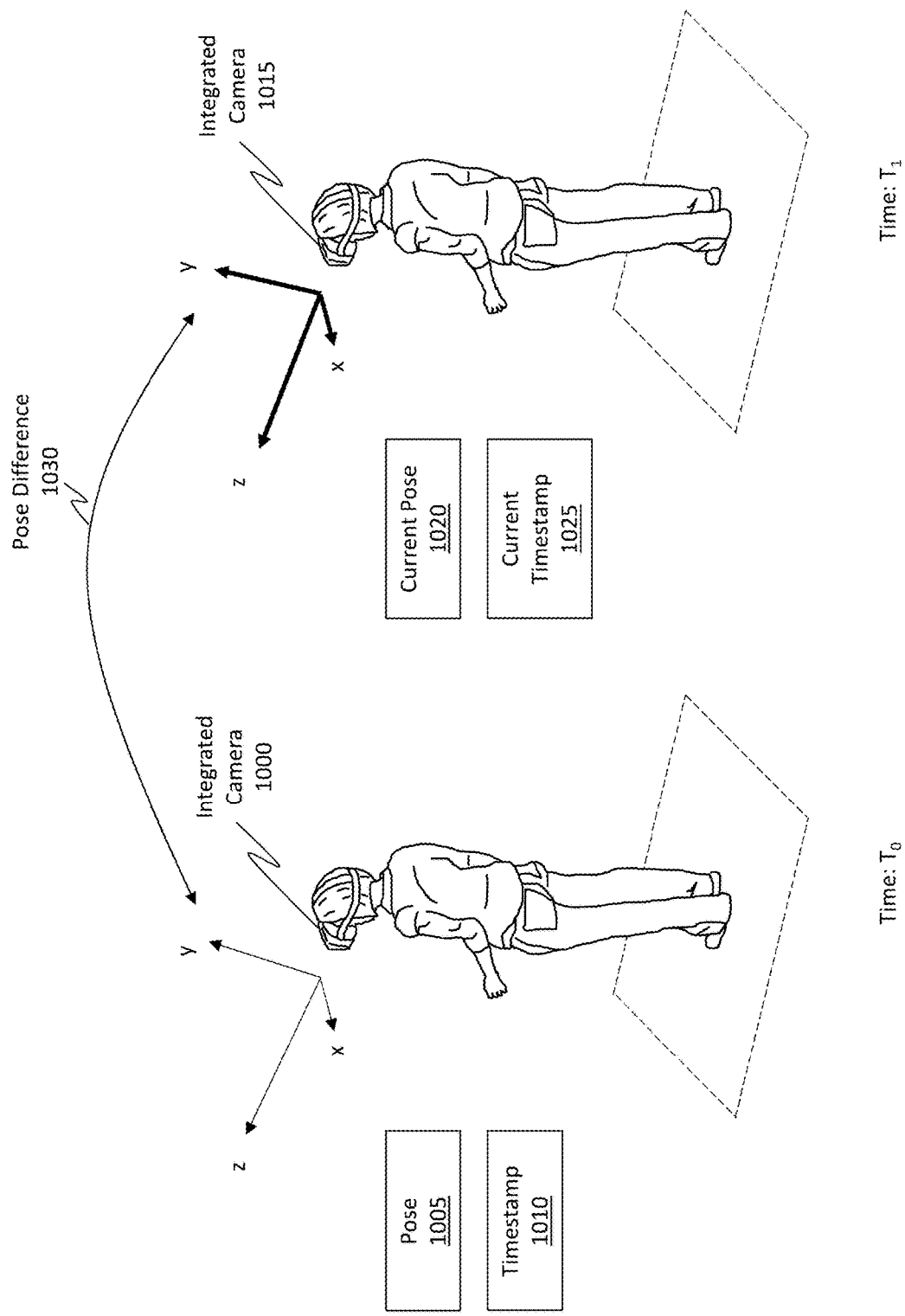
FIG. 10 illustrates how it may be the case that the HMD has shifted pose somewhat since the time the integrated camera image was generated so a late stage reprojection (LSR) process can be performed on the image's pixels to account for the new pose/perspective.
Figure 11:
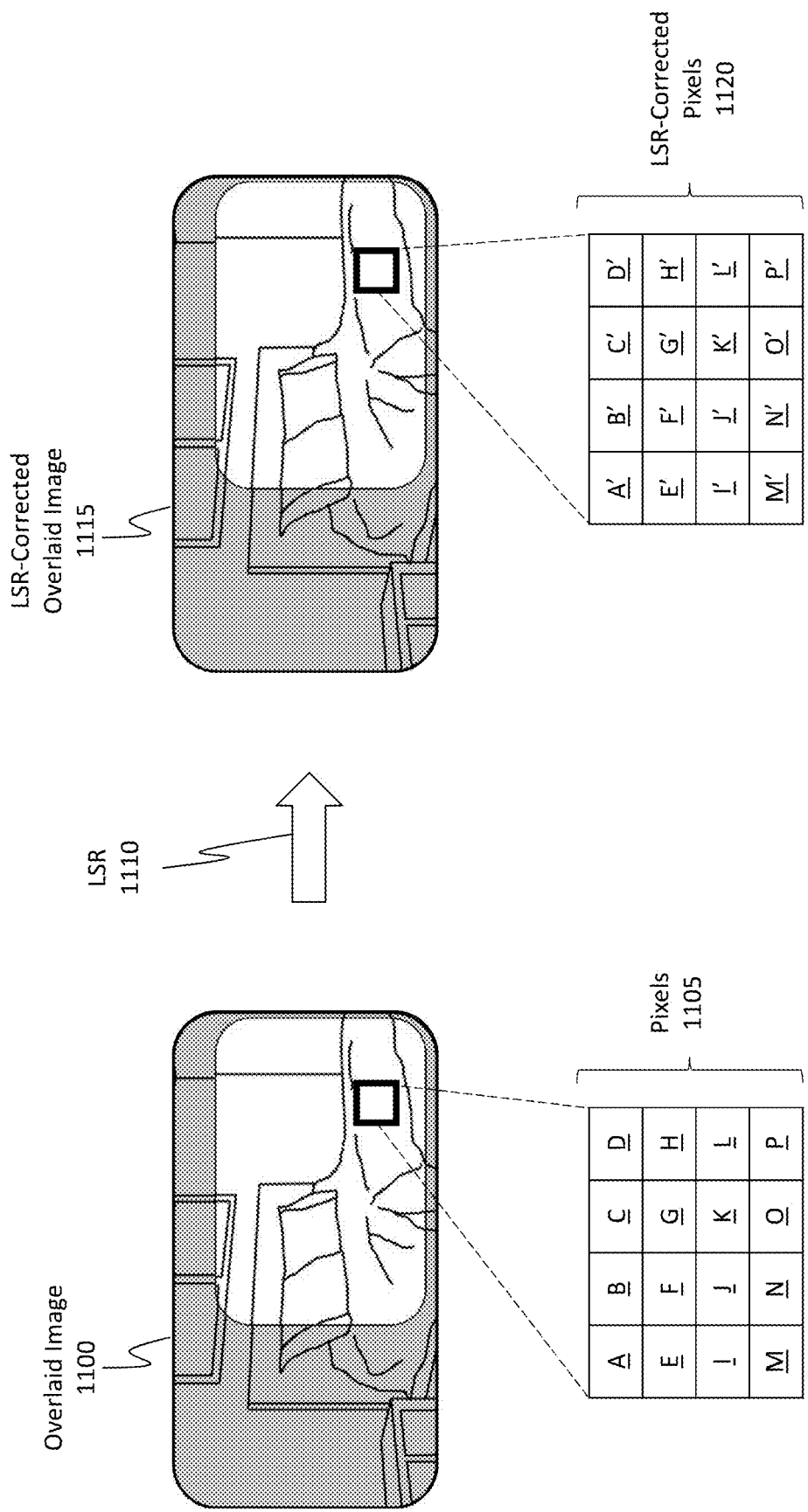
FIG. 11 provides another example illustration of the LSR process.

FIG. 10 shows an integrated camera 1000, which is representative of the integrated cameras discussed thus far. As discussed earlier, the embodiments are able to determine a pose 1005 of the integrated camera 1000 and a timestamp 1010 of when an image was generated by the integrated camera 1000. In this example scenario, the pose 1005 and timestamp 1010 are at time $T_0$.

Prior to the overlaid image being displayed, the HMD has shifted position such that the integrated camera 1015, which is representative of the integrated camera 1000, has shifted position. Now, the integrated camera 1015 has a new or a current pose 1020 and a new or current timestamp 1025, which reflects the time Ti. The previous timestamps, such as timestamp 410 and timestamp 430 from FIG. 4, are different from the current timestamp 1025. The current pose 1020 may be determined using any technique, including IMU data, head tracking data, or any other technique for identifying a pose.

The pose difference 1030 symbolizes the difference between the pose 1005 and the current pose 1020. The pose difference 1030 may be represented using 6 DOF information or 3 DOF information. As a result of this detected pose difference 1030, the embodiments are triggered to perform LSR. Notably, the LSR may be performed on the integrated camera image, the detached camera image, or the overlaid image. FIG. 11 shows an example scenario in which the LSR is performed on the overlaid image.

In particular, FIG. 11 shows an overlaid image 1100, which is representative of the overlaid image 900 from FIG. 9. Overlaid image 1100 is comprised of any number of pixels 1105, such as pixels A, B, C, D, E, F, G, H, I, J, K, L, M, N, O, and P. FIG. 11 also shows a LSR 1110 operation being performed on the overlaid image 1100 to account for a new pose being detected, such as current pose 1020 from FIG. 10.

Figure 12:
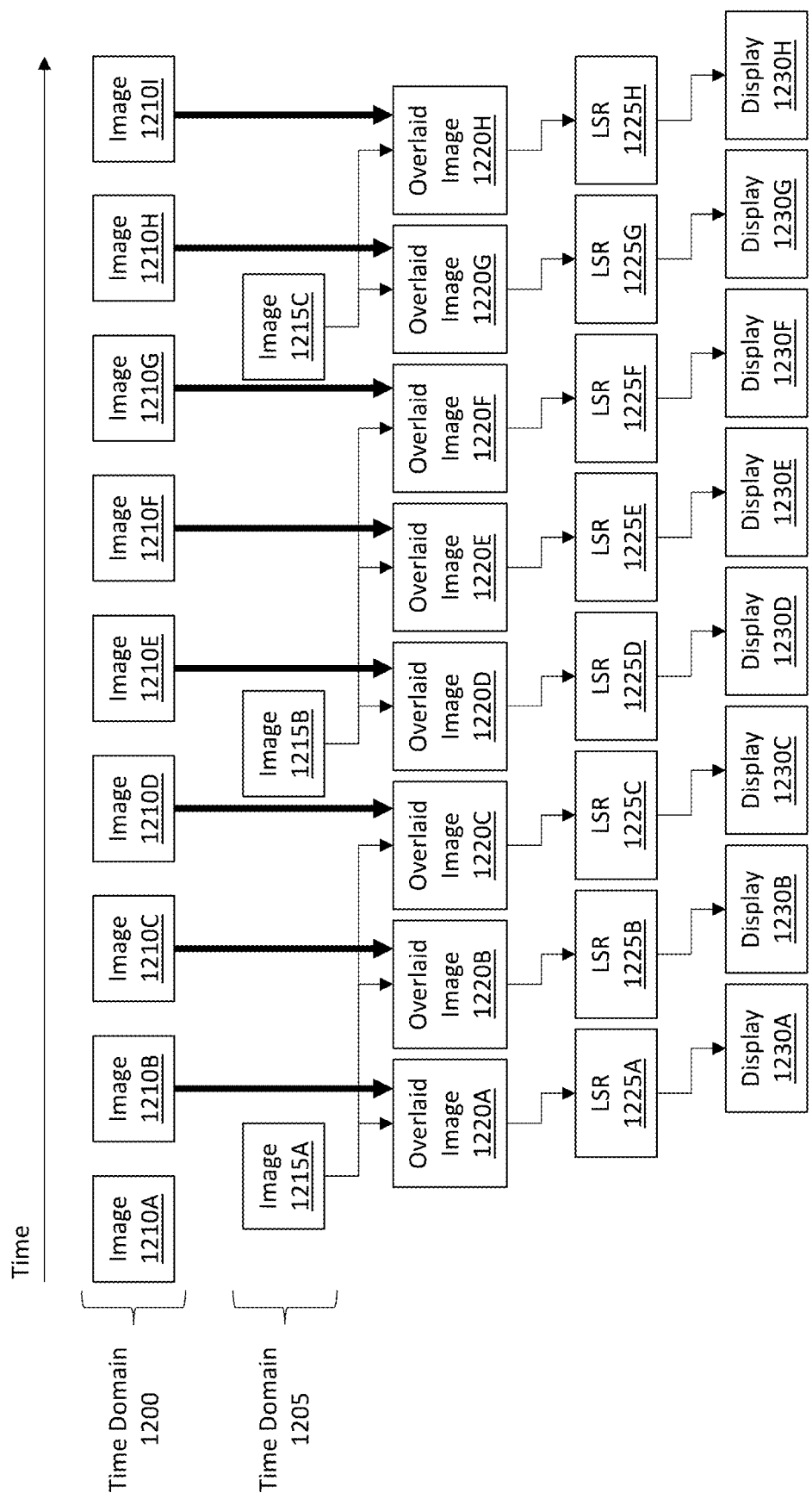
FIG. 12 illustrates a generalized flow diagram of the disclosed processes for aligning image content.

As a result of performing the LSR 1110 operation, a LSR-corrected overlaid image 1115 is generated. Notably, one, some, or all of the pixels in the overlaid image 1100 have been transformed, as shown by the LSR-corrected pixels 1120. For instance, pixel A' is a transformed version of pixel A. Similarly, pixel B' is a transformed version of pixel B. Pixels C', D', E', F', G', H', I', J', K', L', M', N', O', and P' are transformed versions of pixels C, D, E, F, G, H, I, J, K, L, M, N, O, and P, respectively. By performing the LSR 1110 operation, the embodiments are able to correct or compensate for a detected new pose of the HMD, which includes the integrated camera. FIG. 12 illustrates a summary illustration of the principles discussed thus far.

Specifically, FIG. 12 illustrates a first time domain 1200 and a second time domain 1205 during which images are generated. The first time domain 1200 may be associated with the integrated cameras discussed thus far while the second time domain 1205 may be associated with the detached cameras. For instance, an integrated camera may generate images at a rate of 90 Hz while a detached camera may generate images at a rate of 30 Hz.

Image 1210A, Image 1210B, Image 1210C, Image 1210D, Image 1210E, Image 1210F, Image 1210G, Image 1210H, and Image 1210I may all be generated by the integrated camera throughout a period of time, as shown by the "Time" axis. In this example, the detached camera generates images at a lower or reduced rate, as shown by image 1215A, image 1215B, and image 1215C. For instance, the integrated camera generates three images for every one image the detached camera generates.

In accordance with the disclosed principles, the embodiments then perform the alignment processes described earlier in order to generate overlaid images throughout time. For instance, the embodiments utilize the image 1210B and the image 1215A to generate the overlaid image 1220A. Later, the embodiments use the image 1210C and reuse the same image 1215A to generate the overlaid image 1220B. Later, the embodiments use the image 1210D and reuse the image 1215A to generate the overlaid image 1220C. In this regard, a single image (e.g., image 1215A) may be successively used multiple times in combination with other images to generate overlaid images. The refresh rates of the two cameras can be used to determine how many iterations a single camera image can be reused. With refresh rates of 90 Hz and 30 Hz, one of the detached camera images can be used at least three times. Other refresh rate ratios will determine the number of times a single image will be used. Notably, the overlaid images are generated by performing the different alignment processes discussed earlier.

To complete the example, the overlaid image 1220D is generated based on a combination of image 1210E and image 1215B. The overlaid image 1220E is generated based on a combination or an alignment of image 1210F and image 1215B. The overlaid image 1220F is generated based on an alignment of image 1210G and image 1215B. The overlaid image 1220G is generated based on an alignment of image 1210H and image 1215C. The overlaid image 1220H is generated based on a combination of image 1210I and image 1215C.

Subsequently, the embodiments perform a LSR operation on the overlaid image, the integrated camera image, and/or the detached camera image. In the example shown in FIG. 12, the embodiments perform LSR on the overlaid images. For instance, LSR 1225A is performed on the overlaid image 1220A, LSR 1225B is performed on the overlaid image 1220B, LSR 1225C is performed on the overlaid image 1220C, LSR 1225D is performed on the overlaid image 1220D, LSR 1225E is performed on the overlaid image 1220E, LSR 1225F is performed on the overlaid image 1220F, LSR 1225G is performed on the overlaid image 1220G, and LSR 1225H is performed on the overlaid image 1220H.

The LSR-corrected image is then displayed on a display for a user to view. For instance, after the LSR 1225A is performed on the overlaid image 1220A, the embodiments display 1230A the resulting LSR-corrected image. Subsequently, the embodiments display the next LSR corrected image, and so on and so forth as illustrated by display 1230B, display 1230C, display 1230D, display 1230E, display 1230F, display 1230G, and display 1230H. Each of these resulting LSR-corrected images are displayed subsequently in time relative to one another, as shown by the Time axis. Similarly, the rate at which the LSR-corrected images are displayed may correspond to the faster rate of either the integrated camera or the detached camera. In this case, the integrated camera refreshes at a faster rate as compared to the detached camera. Consequently, the display of the LSR-corrected images, or rather the rate of display of those images, may correspond to the rate of the integrated camera. In this case, the rate of display of the LSR-corrected images may be 90 Hz, just like the rate of the integrated camera.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13A:
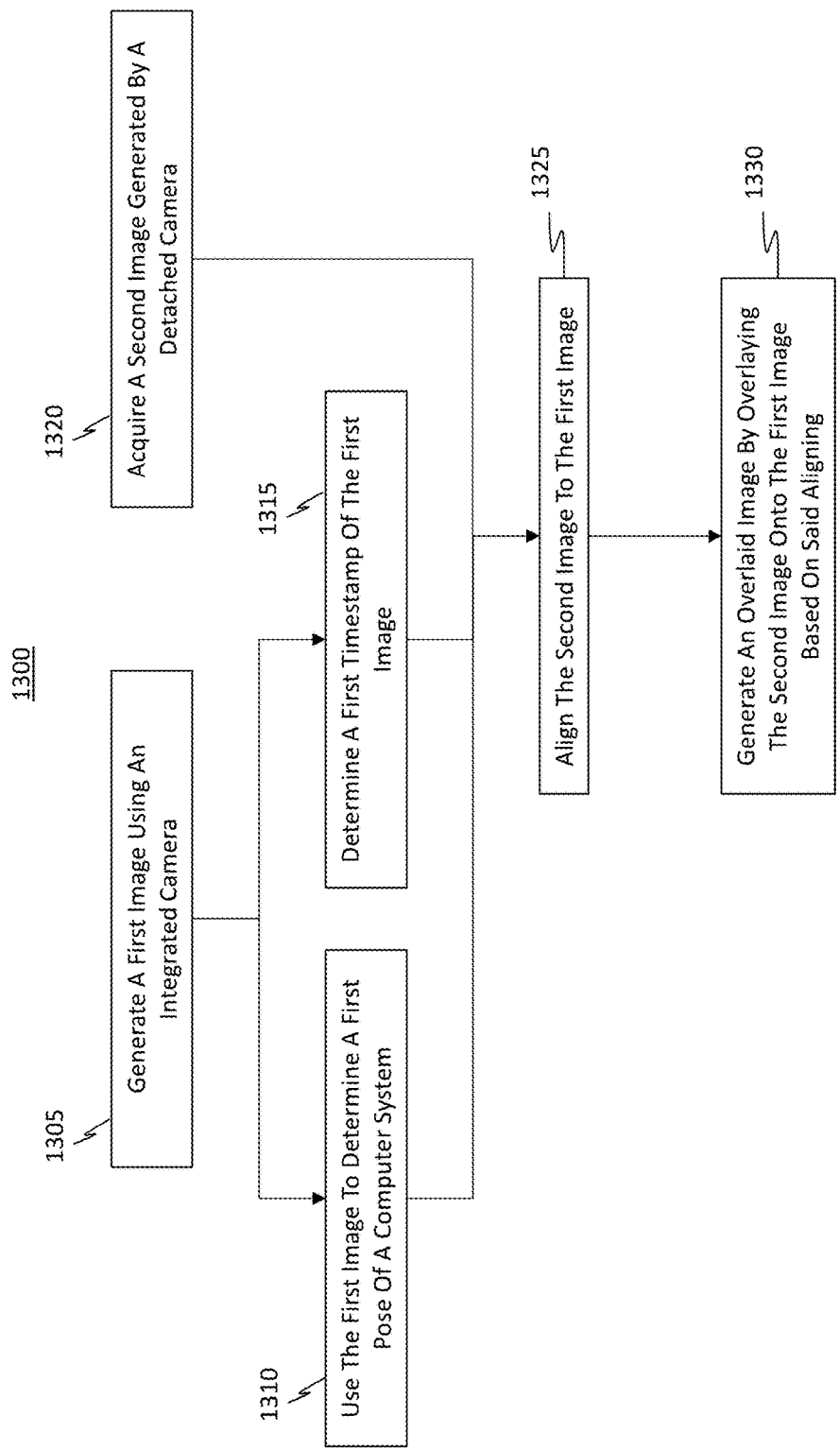
FIGS. 13A and 13B illustrate flowcharts of an example method for aligning and stabilizing (e.g., via late stage reprojection (LSR)) images generated by an integrated camera that is physically mounted to a computer system (e.g., an HMD) with images generated by a detached camera that is physically unmounted from the computer system.
Figure 13B:
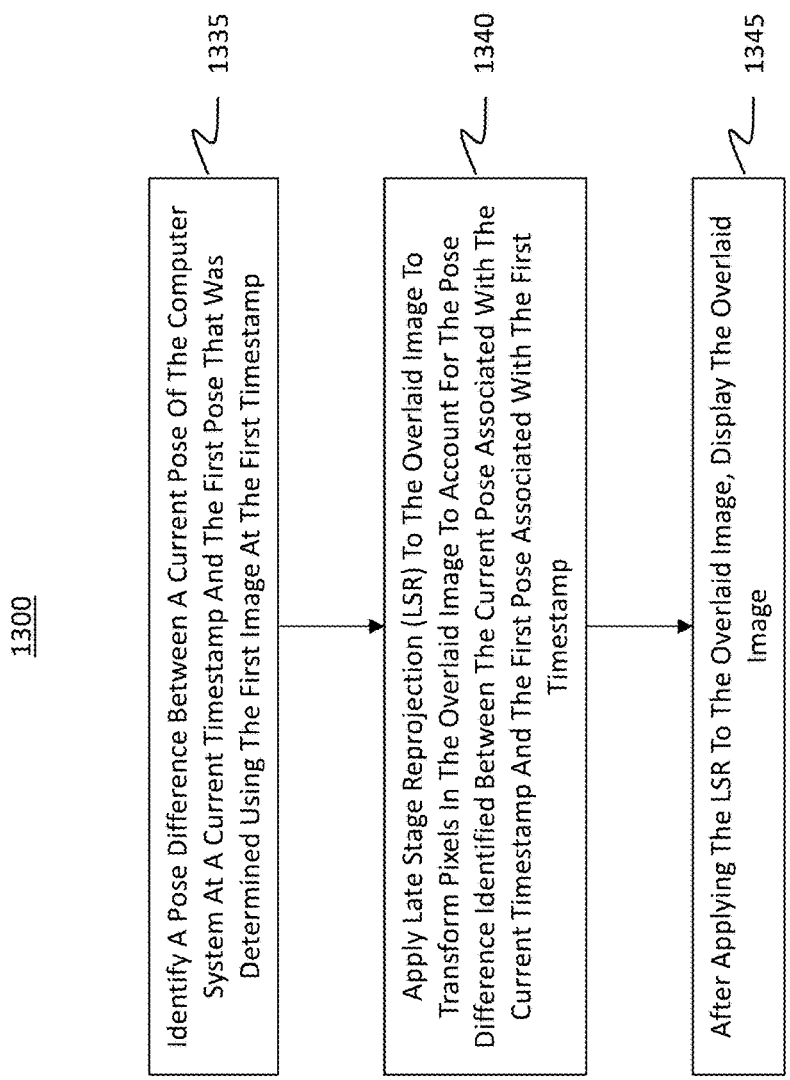

FIGS. 13A and 13B illustrate flowcharts of an example method 1300 for aligning and stabilizing (e.g., via LSR) images generated by an integrated camera (e.g., any of the integrated cameras discussed thus far) that is physically mounted to the computer system with images generated by a detached camera (e.g., any of the detached cameras discussed thus far) that is physically unmounted from the computer system.

The computer system may be a head-mounted device (HMD) worn by a user. In some implementations, the integrated camera is one camera selected from a group of cameras comprising a visible light camera, a low light camera, or a thermal imaging camera. Similarly, the detached camera is also one camera selected from the group of cameras. Furthermore, the detached camera can be oriented to cause a field of view (FOV) of the detached camera to at least partially overlap a FOV of the integrated camera. Of course, any number of additional mounted or unmounted cameras may be used as well provided their FOVs are also overlapping.

Initially, method 1300 includes an act (act 1305) of generating a first image using the integrated camera. The first image may be representative of any of the integrated camera images discussed thus far.

Method 1300 then includes an act (act 1310) of using the first image to determine a first pose of the computer system. For instance, the pose 1005 from FIG. 10 and the pose 405 from FIG. 4 are representative of this "first" pose.

In parallel or in serial with act 1310, method 1300 includes an act (act 1315) of determining a first timestamp of the first image. The timestamp 1010 from FIG. 10 and the timestamp 410 from FIG. 4 are representative of this first timestamp.

Method 1300 also includes an act (act 1320) of acquiring a second image generated by the detached camera. Act 1320 may be performed before, after, or during any of acts 1305, 1310, or 1315. Furthermore, any of the disclosed detached camera images are representative of this "second" image. In some cases, method 1300 includes an act (not illustrated) of determining that the integrated camera and the detached camera are operating at different time domains. Based on this detected difference, the embodiments are able to determine how often a particular image is to be repeatedly used, as was illustrated by the repeated use of image 1215A in FIG. 12. As a specific example, the integrated camera may be detected as operating in conjunction with a 90 Hz refresh rate for displaying content while the detached camera may be detected as operating in conjunction with a 30 Hz refresh rate for displaying content.

Method 1300 then includes an act (act 1325) of aligning the second image to the first image. Any of the alignment processes described in FIG. 6 or 7 may be used to perform the alignment process recited in act 1325. For instance, in some cases, aligning the second image to the first image is performed by identifying image correspondences between the second image and the first image, as illustrated in FIG. 6. In the situation in which image correspondences are used to align the images, the process of aligning the second image to the first image is performed without a dependency on a timestamp or a pose associated with the second image. Instead, the alignment process is based simply on feature correspondences. In some cases, aligning the two images is based on IMU-estimated poses, as illustrated in FIG. 7.

Subsequently, method 1300 includes an act (1330) of generating an overlaid image by overlaying the second image onto the first image based on the alignment process recited in act 1325. Any one of the overlaid images 1220A-1220H illustrated in FIG. 12 as well as the overlaid image 900 from FIG. 9 may be representative of the overlaid image in act 1330.

Method 1300 continues on in FIG. 13B and includes an act (act 1335) of identifying a pose difference between a current pose of the computer system at a current timestamp and the first pose that was determined using the first image at the first timestamp. For instance, the pose difference 1030 of FIG. 10 is representative of the pose difference recited in act 1335, where the pose difference 1030 is based on a difference between the pose 1005 determined at timestamp 1010 and the current pose 1020 determined at current timestamp 1025.

Method 1300 then includes an act (act 1340) of applying late stage reprojection (LSR) to the overlaid image. The LSR 1110 in FIG. 11 is representative of the LSR operation recited in act 1340. This LSR process transforms pixels in the overlaid image (e.g., pixels 1105 of FIG. 11) to account for the pose difference identified between the current pose associated with the current timestamp and the first pose associated with the first timestamp. The transformations produce the LSR-corrected pixels 1120 of FIG. 11.

After applying the LSR to the overlaid image, method 1300 includes an act (act 1345) of displaying the overlaid image, which is a type of passthrough image. The image may be displayed in a display of an HMD.

Accordingly, the disclosed embodiments can be used to bring about substantial improvements to how visual content is generated, aligned, and displayed. By way of example, image content from one image can be extracted and overlaid onto another image in order to provide an enhanced visualization for a user. This visualization will enable the user to improve his/her interactions with the computer system. Furthermore, the disclosed alignment processes may be performed irrespective of any timing differences between the images.

Example Computer/Computer Systems

Figure 14:
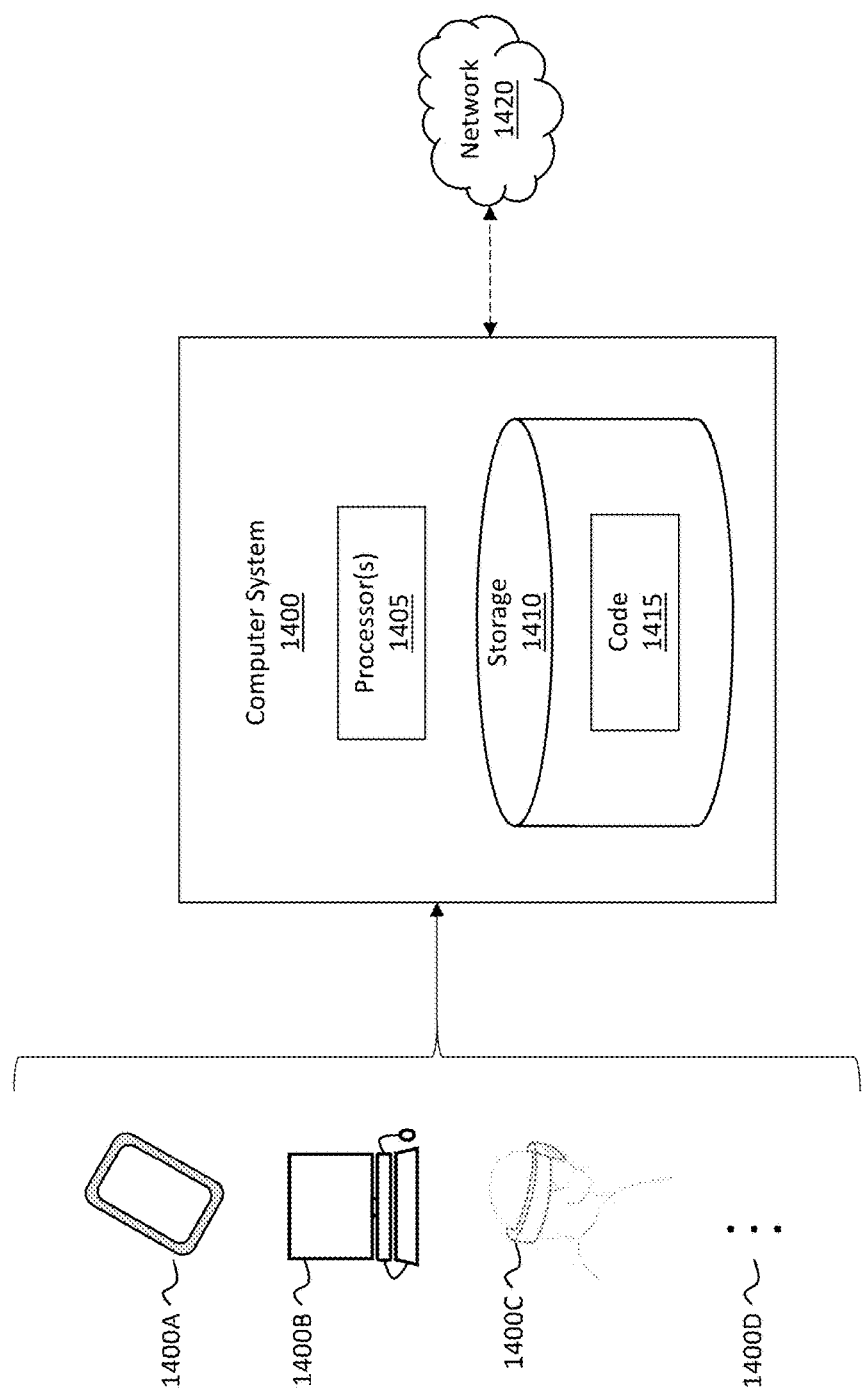
FIG. 14 illustrates a high-level overview of an example computer system configured to perform any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet 1400A, a desktop or a laptop 1400B, a wearable device such as an HMD 1400C (which is representative of the HMDs discussed herein), a mobile device, or any other type of standalone device, as represented by the ellipsis 1400D. Computer system 1400 may also be a distributed system that includes one or more connected computing components/devices that are in communication with computer system 1400.

In its most basic configuration, computer system 1400 includes various different components. FIG. 14 shows that computer system 1400 includes one or more processor(s) 1405 (aka a "hardware processing unit") and storage 1410. Although not illustrated, the computer system 1400 may include any of the features recited in connection with FIGS. 1 and 2, as well as any other features recited in this disclosure. It should be noted how none of the disclosed features are mutually exclusive and that any feature recited herein may be combined with any other feature recited herein.

Regarding the processor(s) 1405, it will be appreciated that the functionality described herein can be performed, at least in part, by one or more hardware logic components (e.g., the processor(s) 1405). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

Any type of depth detection may be utilized by the computer system 1400 and by the scanning sensor(s). Examples include, but are not limited to, stereoscopic depth detection (both active illumination (e.g., using a dot illuminator), structured light illumination (e.g., 1 actual camera, 1 virtual camera, and 1 dot illuminator), and passive (i.e. no illumination)), time of flight depth detection (with a baseline between the laser and the camera, where the field of view of the camera does not perfectly overlap the field of illumination of the laser), range finder depth detection, or any other type of range or depth detection.

Machine learning (ML) may also be utilized by the disclosed embodiments, as discussed earlier. ML may be implemented as a specific processing unit (e.g., a dedicated processing unit as described earlier) configured to perform one or more specialized operations for the computer system 1400. As used herein, the terms "executable module," "executable component," "component," "module," "model," or "engine" can refer to hardware processing units or to software objects, routines, or methods that may be executed on computer system 1400. The different components, modules, engines, models, and services described herein may be implemented as objects or processors that execute on computer system 1400 (e.g. as separate threads). ML models and/or the processor(s) 1405 can be configured to perform one or more of the disclosed method acts or other functionalities.

Storage 1410 may be physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage 1410 is shown as including executable instructions (i.e. code 1415). The executable instructions represent instructions that are executable by the processor(s) 1405 (or perhaps even a ML model) of computer system 1400 to perform the disclosed operations, such as those described in the various methods.

The disclosed embodiments may comprise or utilize a special-purpose or general-purpose computer including computer hardware, such as, for example, one or more processors (such as processor(s) 1405) and system memory (such as storage 1410), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network. Furthermore, computer system 1400 may also be connected through one or more wired or wireless networks 1420 to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system configured to align and stabilize images generated by an integrated camera that is physically mounted to the computer system with images generated by a detached camera that is physically unmounted from the computer system, said computer system comprising:

one or more processors; and one or more computer-readable hardware storage devices that store instructions that are executable by the one or more processors to cause the computer system to at least:

generate a first image using the integrated camera, wherein the integrated camera is of a first type comprising one of a visible light camera type or a low light camera type, and wherein resulting image content that is generated by the integrated camera includes non-thermal content;

use the first image to determine a first pose of the computer system;

determine a first timestamp of the first image;

acquire a second image generated by the detached camera, wherein the detached camera is of a second type comprising a thermal camera type, and wherein resulting image content that is generated by the detached camera includes thermal content;

align the second image to the first image, wherein said alignment occurs despite a difference in camera type between the integrated camera and the detached camera such that the alignment occurs even between the thermal content in the second image and the non-thermal content in the first image;

generate an overlaid image by overlaying the second image onto the first image based on said aligning;

identify a pose difference between a current pose of the computer system at a current timestamp and the first pose that was determined using the first image at the first timestamp;

apply late stage reprojection (LSR) to the overlaid image to transform pixels in the overlaid image to account for the pose difference identified between the current pose associated with the current timestamp and the first pose associated with the first timestamp, wherein the LSR is configured to correct for a 3 degrees of freedom (DOF) change included in the pose difference such that forward or backward projections are avoided during application of the LSR; and after applying the LSR to the overlaid image, display the overlaid image.

2. The computer system of claim 1, wherein execution of the instructions further causes the computer system to determine the integrated camera and the detached camera are operating in different time domains.

3. The computer system of claim 2, wherein the integrated camera operates in conjunction with a 90 Hz refresh rate for displaying content and the detached camera operates in conjunction with a 30 Hz refresh rate for displaying content.

4. The computer system of claim 1, wherein aligning the second image to the first image is performed by identifying image correspondences between the second image and the first image.

5. The computer system of claim 1, wherein aligning the second image to the first image is performed by:

attempting to identify image correspondences between the second image and the first image;

determining one or both of the second image and the first image lack a sufficient amount of texture in order to identify the image correspondences;

using a first inertial measurement unit (IMU) of the computer system to estimate an IMU-estimated pose of the computer system;

using a second IMU of the detached camera to estimate an IMU-estimated pose of the detached camera; and aligning the second image to the first image by aligning the IMU-estimated pose of the computer system with the IMU-estimated pose of the detached camera.

6. The computer system of claim 1, wherein aligning the second image to the first image is performed without a dependency on a timestamp associated with the second image.

7. The computer system of claim 1, wherein aligning the second image to the first image is performed by:

identifying image correspondences between the second image and the first image; and based on the identified image correspondences, fitting the correspondences to a motion model such that the second image is projected onto the first image.

8. The computer system of claim 7, wherein the motion model is a rotational motion model.

9. The computer system of claim 7, wherein the motion model is a similarity transform model configured to allow for (i) rotation of the first image or the second image, (ii) scaling of the first image or the second image, or (iii) homographic transformations of the first image or the second image.

10. The computer system of claim 1, wherein the integrated camera is the low light camera.

11. The computer system of claim 10, wherein, when not generating one or more images, the low light camera operates in a powered-down state.

12. A method for aligning and stabilizing images generated by an integrated camera that is physically mounted to a computer system with images generated by a detached camera that is physically unmounted from the computer system, said method comprising:

generating a first image using the integrated camera, wherein the integrated camera is of a first type comprising one of a visible light camera type or a low light camera type, and wherein resulting image content that is generated by the integrated camera includes non-thermal content;

using the first image to determine a first pose of the computer system;

determining a first timestamp of the first image;

acquiring a second image generated by the detached camera, wherein the detached camera is of a second type comprising a thermal camera type, and wherein resulting image content that is generated by the detached camera includes thermal content;

aligning the second image to the first image, wherein said alignment occurs despite a difference in camera type between the integrated camera and the detached camera such that the alignment occurs even between the thermal content in the second image and the non-thermal content in the first image;

generating an overlaid image by overlaying the second image onto the first image based on said aligning;

identifying a pose difference between a current pose of the computer system at a current timestamp and the first pose that was determined using the first image at the first timestamp;

applying late stage reprojection (LSR) to the overlaid image to transform pixels in the overlaid image to account for the pose difference identified between the current pose associated with the current timestamp and the first pose associated with the first timestamp, wherein the LSR is configured to correct for a 3 degrees of freedom (DOF) change included in the pose difference such that forward or backward projections are avoided during application of the LSR; and after applying the LSR to the overlaid image, displaying the overlaid image.

13. The method of claim 12, wherein the computer system is a head-mounted device (HMD) worn by a user, and wherein the detached camera is oriented to cause a field of view (FOV) of the detached camera to at least partially overlap a FOV of the integrated camera.

14. The method of claim 12, wherein the first timestamp of the first image is different from a second timestamp of the second image.

15. The method of claim 14, wherein the first timestamp and the second timestamp are both different from the current timestamp.

16. The method of claim 12, wherein the integrated camera and the detached camera operate in different time domains.

17. The method of claim 12, wherein aligning the second image to the first image is performing by identifying image correspondences between the second image and the first image.

18. The method of claim 12, wherein aligning the second image to the first image is performed by:
   using a first inertial measurement unit (IMU) of the computer system to estimate an IMU-estimated pose of the computer system;
   using a second IMU of the detached camera to estimate an IMU-estimated pose of the detached camera; and
   aligning the second image to the first image by aligning the IMU-estimated pose of the computer system with the IMU-estimated pose of the detached camera.

19. The method of claim 12, wherein aligning the second image to the first image is performed without a dependency on a timestamp associated with the second image.

20. A head-mounted device (HMD) configured to align and stabilize images generated by an integrated camera that is physically mounted to the HMD with images generated by a detached camera that is physically unmounted from the HMD, said HMD comprising:
   a display;
   one or more processors; and
   one or more computer-readable hardware storage devices that store instructions that are executable by the one or more processors to cause the HMD to at least:
   generate a first image using the integrated camera, wherein the integrated camera is of a first type comprising one of a visible light camera type or a low light camera type, and wherein resulting image content that is generated by the integrated camera includes non-thermal content;
   use the first image to determine a first pose of the HMD;
   determine a first timestamp of the first image;
   acquire a second image generated by the detached camera, wherein the detached camera is of a second type comprising a thermal camera type, and wherein resulting image content that is generated by the detached camera includes thermal content;
   align the second image to the first image, wherein said alignment occurs despite a difference in camera type between the integrated camera and the detached camera such that the alignment occurs even between the thermal content in the second image and the non-thermal content in the first image;
   generate an overlaid image by overlaying the second image onto the first image based on said aligning;
   identify a pose difference between a current pose of the HMD at a current timestamp and the first pose that was determined using the first image at the first timestamp;
   apply late stage reprojection (LSR) to the overlaid image to transform pixels in the overlaid image to account for the pose difference identified between the current pose associated with the current timestamp and the first pose associated with the first timestamp, wherein the LSR is configured to correct for a 3 degrees of freedom (DOF) change included in the pose difference such that forward or backward projections are avoided during application of the LSR; and
   after applying the LSR to the overlaid image, display the overlaid image on the display of the HMD.

* * * * *